United States Patent
Zhang et al.

(10) Patent No.: US 11,601,886 B2
(45) Date of Patent: *Mar. 7, 2023

(54) EFFICIENT POWER UTILIZATION FOR ENHANCED COMPONENT CARRIERS

(71) Applicant: QUALCOMM Incorporated, San Diego, CA (US)

(72) Inventors: Xiaoxia Zhang, San Diego, CA (US); Wei Zhang, San Diego, CA (US); Aleksandar Damnjanovic, Del Mar, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 48 days.

This patent is subject to a terminal disclaimer.

(21) Appl. No.: 16/940,162

(22) Filed: Jul. 27, 2020

(65) Prior Publication Data

US 2021/0007052 A1 Jan. 7, 2021

Related U.S. Application Data

(63) Continuation of application No. 15/596,869, filed on May 16, 2017, now Pat. No. 10,728,852.
(Continued)

(51) Int. Cl.
*H04W 52/02* (2009.01)
*H04L 5/00* (2006.01)
(Continued)

(52) U.S. Cl.
CPC ......... *H04W 52/0232* (2013.01); *H04L 5/001* (2013.01); *H04L 5/0053* (2013.01);
(Continued)

(58) Field of Classification Search
CPC combination set(s) only.
See application file for complete search history.

(56) References Cited

U.S. PATENT DOCUMENTS

| | | |
|---|---|---|
| 8,433,251 B2 | 4/2013 | Chen et al. |
| 9,185,706 B2 | 11/2015 | Lindoff et al. |

(Continued)

FOREIGN PATENT DOCUMENTS

| | | |
|---|---|---|
| CN | 102204386 A | 9/2011 |
| CN | 102474403 A | 5/2012 |

(Continued)

OTHER PUBLICATIONS

Junfeng S., et al., "Standardization Research on Key Technology of 3GPP LAA-LTE Physical Layer", Telecommunications Network Technology, Issue 12, Dec. 15, 2015, 5 Pages.

(Continued)

*Primary Examiner* — Xavier S Wong
(74) *Attorney, Agent, or Firm* — Holland & Hart LLP

(57) ABSTRACT

Methods, systems, and devices for wireless communication are described. A user equipment (UE) may monitor a narrowband (e.g., a single carrier, anchor carrier, etc.) for a control message that includes a grant for downlink data transmissions. The narrowband containing the control message may be a portion of a system bandwidth. The UE may then monitor a wideband (e.g., all or multiple carriers of the system bandwidth) for data according to the control message. Monitoring the wideband may include additional or alternate circuitry being powered (e.g., receiver circuit switching) to enable reception on an increased range of frequency spectrum. In some examples, a gap or narrowband data transmission may be scheduled between the control message and the grant to allow grant processing and receiver circuitry switching at the UE. In some cases, the control (Continued)

message and data transmission may be received in the same or different transmission time intervals (TTIs).

29 Claims, 17 Drawing Sheets

Related U.S. Application Data

(60) Provisional application No. 62/363,694, filed on Jul. 18, 2016.

(51) Int. Cl.
| | |
|---|---|
| *H04W 76/28* | (2018.01) |
| *H04W 72/04* | (2009.01) |
| *H04W 72/12* | (2009.01) |
| *H04W 72/14* | (2009.01) |
| *H04W 72/0446* | (2023.01) |

(52) U.S. Cl.
CPC ... *H04W 72/0446* (2013.01); *H04W 72/1289* (2013.01); *H04W 72/14* (2013.01); *H04W 76/28* (2018.02); *Y02D 30/70* (2020.08)

(56) References Cited

U.S. PATENT DOCUMENTS

| | | | |
|---|---|---|---|
| 9,203,559 | B2 | 12/2015 | Wang et al. |
| 9,369,990 | B2 | 6/2016 | Damnjanovic et al. |
| 9,474,073 | B2 | 10/2016 | Barriac et al. |
| 9,736,829 | B2 | 8/2017 | Chen et al. |
| 9,820,281 | B1 | 11/2017 | Werner et al. |
| 9,883,404 | B2 | 1/2018 | Malladi et al. |
| 9,960,890 | B2 | 5/2018 | Lei et al. |
| 10,111,190 | B2* | 10/2018 | Pelletier .............. H04W 52/246 |
| 10,461,975 | B2 | 10/2019 | Chen et al. |
| 10,505,842 | B2 | 12/2019 | Au et al. |
| 10,547,354 | B2* | 1/2020 | Tooher .................. H04B 7/026 |
| 10,728,852 | B2* | 7/2020 | Zhang ............... H04W 52/0232 |
| 11,012,270 | B2* | 5/2021 | Lindoff ............... H04L 27/0012 |
| 2011/0183663 | A1 | 7/2011 | Kenehan et al. |
| 2011/0267957 | A1 | 11/2011 | Du et al. |
| 2012/0113941 | A1 | 5/2012 | Chung et al. |
| 2013/0083707 | A1 | 4/2013 | Wang |
| 2013/0188582 | A1 | 7/2013 | Dinan |
| 2013/0344909 | A1 | 12/2013 | Davydov et al. |
| 2014/0044090 | A1 | 2/2014 | Beale |
| 2014/0162666 | A1 | 6/2014 | Ratasuk et al. |
| 2015/0029923 | A1 | 1/2015 | Xu et al. |
| 2015/0085720 | A1 | 3/2015 | Gaal et al. |
| 2016/0057741 | A1 | 2/2016 | Seo et al. |
| 2016/0127991 | A1 | 5/2016 | Ang et al. |
| 2016/0128028 | A1 | 5/2016 | Mallik et al. |
| 2016/0142292 | A1* | 5/2016 | Au .......................... H04W 4/50 |
| | | | 370/352 |
| 2016/0149677 | A1 | 5/2016 | Morioka |
| 2016/0309468 | A1 | 10/2016 | Chen et al. |
| 2016/0345249 | A1 | 11/2016 | Yoo et al. |
| 2016/0345347 | A1* | 11/2016 | Cheng ................... H04W 72/14 |
| 2016/0353475 | A1* | 12/2016 | Au ........................ H04L 5/0042 |
| 2017/0196016 | A1 | 7/2017 | Tabet et al. |
| 2017/0208574 | A1 | 7/2017 | Ramakrishna et al. |
| 2018/0020408 | A1 | 1/2018 | Zhang et al. |
| 2018/0254794 | A1 | 9/2018 | Lee et al. |
| 2018/0352570 | A1* | 12/2018 | Sun ........................ H04W 72/14 |

FOREIGN PATENT DOCUMENTS

| | | |
|---|---|---|
| CN | 102823186 A | 12/2012 |
| CN | 103841648 A | 6/2014 |
| CN | 104521161 A | 4/2015 |
| CN | 104620641 A | 5/2015 |
| EP | 2983307 A1 | 2/2016 |
| WO | WO-2011038405 A2 | 3/2011 |
| WO | WO-2014047914 A1 | 4/2014 |
| WO | WO-2014200951 A2 | 12/2014 |
| WO | WO-2015017374 | 2/2015 |
| WO | WO-2015048404 A1 | 4/2015 |
| WO | WO-2015057367 A1 | 4/2015 |
| WO | WO-2015066326 A1 | 5/2015 |
| WO | WO-2018017491 A1 | 1/2018 |

OTHER PUBLICATIONS

NTT DOCOMO et al., "Discussion on UL Scheduling Design for eLAA" [online], 3GPP TSG RAN WG1 Meeting #84, R1-160947, Feb. 14, 2016, XP051054255, 5 pages, Retrieved from the Internet: URL:http://www.3gpp.org/ftp/Meetings_3GPP_SYNC/RAN1/Docs/.

QUALCOMM Incorporated: "Adaptive Bandwidth for Control and Data," 3GPP Draft,3GPPTSG RAN WG1 #87,R1-1612070_Adaptive_BW_For_Control_And_Data, 3rd Generation Partnership Project (3GPP), Mobile Competence Centre, 650, Route Des Lucioles, F-06921 Sophia-Antipolis Cedex, France, vol. RAN WG1, No. Reno, Nevada, USA; Nov. 14, 2016-Nov. 18, 2016, Nov. 13, 2016, XP051176030, 5 pages, Retrieved from the Internet: URL: http://www.3gpp.org/ftp/Meetings_3GPP_SYNC/RAN1/Docs/ [retrieved on Nov. 13, 2016].

International Preliminary Report on Patentability—PCT/US2017/042421, The International Bureau of WIPO—Geneva, Switzerland, dated Jan. 31, 2019 (164044WO).

International Search Report and Written Opinion—PCT/US2017/042421—ISA/EPO—dated Oct. 18, 2017 (164044WO).

Nokia Networks: "Retuning Gaps for MTC", 3GPP Draft; R1-155132, 3rd Generation Partnership Project (3GPP), Mobile Competence Centre ; 650, Route Des Lucioles; F-06921 Sophia-Antipolis Ceoex; France, vol. RAN WG1, No. Malmo, Sweden; Oct. 4, 2015, XP051002116, Retrieved from the Internet: URL:http://www.3gpp.org/ftp/Meetings_3GPP SYNC/RAN1/Docs/ [retrieved on Oct. 4, 2015], 6 pages.

Renesas Mobile Europe LTD: "Retuing Interruptions for CA Activation/ deactivation and Configuration/ deconfiguration", 3GPP Draft; R4-121354, 3rd Generation Partnership Project (3GPP), Mobile Competence Centre; 650, Route Des Lucioles; F-06921 Sophia-Antipolis Cedex; France, vol. RAN WG4, No. Jeju, Korea; Mar. 26, 2012-Mar. 30, 2012, Mar. 19, 2012, XP050612829, 5 pages, [retrieved on Mar. 19, 2012] pp. 2-4.

\* cited by examiner

EFFICIENT POWER UTILIZATION FOR ENHANCED COMPONENT CARRIERS

CROSS REFERENCES

The present Application for Patent is a Continuation of U.S. patent application Ser. No. 15/596,869 by Zhang et al., entitled "Efficient Power Utilization For Enhanced Component Carriers" filed May 16, 2017, which claims priority to U.S. Provisional Patent Application No. 62/363,694 by Zhang, et al., entitled "Efficient Power Utilization For Enhanced Component Carriers," filed Jul. 18, 2016, each of which is assigned to the assignee hereof, and each of which is expressly incorporated by reference herein.

BACKGROUND

The following relates generally to wireless communication, and more specifically to efficient power utilization for enhanced component carriers (eCCs), multicarrier systems, wideband systems, etc.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

UEs operating in wireless communication systems supporting carrier aggregation (e.g., communication over more than one frequency carrier) may suffer from increased power consumption, for example where the UE monitors a set of carriers that may or may not contain information relevant to the UE during a particular time interval. For example, a UE may monitor a system bandwidth, including multiple carriers, for grants of downlink data transmission resources, as well as data transmissions. However, some or all carriers of the system bandwidth may not contain grants or data directed towards the UE during a particular time interval. Monitoring all carriers of the system bandwidth (e.g., wideband monitoring) may result in unnecessary power consumption.

SUMMARY

The described techniques relate to improved methods, systems, devices, or apparatuses that support efficient power utilization for wireless communications system using enhanced component carriers (eCCs). Techniques discussed herein may be applicable to any multicarrier or wideband system where a user equipment (UE) is capable of monitoring a portion of an overall system bandwidth (e.g., not required to open up the receiver to monitor radio frequency based on the overall system bandwidth). A UE may monitor a narrowband (e.g., a single carrier of a plurality of eCC, an anchor carrier, a control subband, etc.) for a control message that includes a grant for downlink data transmissions. The narrowband carrying the control message may be a portion of a system bandwidth, or a portion of a wideband. The UE may then monitor a wideband (e.g., all or multiple carriers of the system bandwidth) for data according to the control message. Monitoring the wideband may include additional or alternate circuitry being powered, for example through switching of circuits of a receiver or transceiver, to enable reception on an increased range of frequency spectrum. In some examples, a narrowband data transmission or a gap in transmissions may be scheduled between the control message and the grant. The gap may allow the UE time to process one or more grants and prepare the UE's receiver circuitry to switch to receive downlink transmissions over a wideband. In some cases, the control message (e.g., including the grant) and data transmissions may be received in the same transmission time interval (TTI). In other examples, the data transmission may be received in a TTI according to a grant received in an immediately preceding TTI or in a previous TTI (e.g., a cross transmission opportunity downlink grant), for example, where a clear channel assessment (CCA) has failed and the data transmission associated with the grant occurs one or more TTIs after the previous TTI. In other examples, the UE may not receive or successfully receive a control message indicating a grant for downlink data transmission resources, in which case, the UE may enter a discontinuous reception (DRX) mode.

A method of wireless communication is described. The method may include monitoring a first bandwidth with a receiver of a wireless device, receiving, in the first bandwidth, a control message that includes a grant of downlink data transmission resources for the wireless device, determining to monitor a second bandwidth for a data transmission for the wireless device as specified by the grant, and monitoring the second bandwidth with the receiver for the data transmission during a TTI, wherein a time gap exists between the received control message and the data transmission.

An apparatus for wireless communication is described. The apparatus may include means for monitoring a first bandwidth with a receiver of a wireless device, means for receiving, in the first bandwidth, a control message that includes a grant of downlink data transmission resources for the wireless device, means for determining to monitor a second bandwidth for a data transmission for the wireless device as specified by the grant, and means for monitoring the second bandwidth with the receiver for the data transmission during a TTI, wherein a time gap exists between the received control message and the data transmission.

A method of wireless communication is described. The method may include transmitting, in a first bandwidth, a control message that includes a grant of downlink data transmission resources for a wireless device, wherein the grant specifies a second bandwidth for a data transmission for the wireless device, scheduling a time gap between the control message and the data transmission, and transmitting, in the second bandwidth, the data transmission during a TTI based at least in part on the scheduled time gap.

An apparatus for wireless communication is described. The apparatus may include means for transmitting, in a first bandwidth, a control message that includes a grant of downlink data transmission resources for a wireless device, wherein the grant specifies a second bandwidth for a data transmission for the wireless device, means for scheduling a time gap between the control message and the data transmission, and means for transmitting, in the second bandwidth, the data transmission during a TTI based at least in part on the scheduled time gap.

Another apparatus for wireless communication is described. The apparatus may include a processor, memory in electronic communication with the processor, and instructions stored in the memory. The instructions may be operable to cause the processor to monitor a first bandwidth with a receiver of a wireless device, receive, in the first bandwidth, a control message that includes a grant of downlink data transmission resources for the wireless device, determine to monitor a second bandwidth for a data transmission for the wireless device as specified by the grant, and monitor the second bandwidth with the receiver for the data transmission during a TTI, wherein a time gap exists between the received control message and the data transmission.

A non-transitory computer readable medium for wireless communication is described. The non-transitory computer-readable medium may include instructions operable to cause a processor to monitor a first bandwidth with a receiver of a wireless device, receive, in the first bandwidth, a control message that includes a grant of downlink data transmission resources for the wireless device, determine to monitor a second bandwidth for a data transmission for the wireless device as specified by the grant, and monitor the second bandwidth with the receiver for the data transmission during a TTI, wherein a time gap exists between the received control message and the data transmission.

In some examples of the method, apparatus, and non-transitory computer-readable medium described above, the time gap allows the wireless device to process the grant or prepare receiver circuits to switch from a narrowband receiver to a wideband receiver. In some examples of the method, apparatus, and non-transitory computer-readable medium described above, the second bandwidth comprises a wideband. In some examples of the method, apparatus, and non-transitory computer-readable medium described above, the first bandwidth comprises a narrowband portion of the wideband.

Some examples of the method, apparatus, and non-transitory computer-readable medium described above may further include processes, features, means, or instructions for monitoring the first bandwidth comprises monitoring the first bandwidth with a narrowband receiver circuit of the receiver. Some examples of the method, apparatus, and non-transitory computer-readable medium described above may further include processes, features, means, or instructions for monitoring the second bandwidth comprises monitoring the second bandwidth with a wideband receiver circuit of the receiver.

In some examples of the method, apparatus, and non-transitory computer-readable medium described above, the first bandwidth comprises an anchor carrier. In some examples of the method, apparatus, and non-transitory computer-readable medium described above, the second bandwidth comprises one or more carriers. In some examples of the method, apparatus, and non-transitory computer-readable medium described above, the one or more carriers comprise the anchor carrier and one or more other carriers.

Some examples of the method, apparatus, and non-transitory computer-readable medium described above may further include processes, features, means, or instructions for receiving the data transmission in the second bandwidth during a second part of the TTI, wherein the grant may be received in a first part of the TTI before the second part of the TTI.

Some examples of the method, apparatus, and non-transitory computer-readable medium described above may further include processes, features, means, or instructions for processing the grant during the first part of the TTI and prior to receiving the data transmission. In some examples of the method, apparatus, and non-transitory computer-readable medium described above, a time gap may be inserted between the control message and the data transmission.

Some examples of the method, apparatus, and non-transitory computer-readable medium described above may further include processes, features, means, or instructions for decoding the control message during the time gap. Some examples of the method, apparatus, and non-transitory computer-readable medium described above may further include processes, features, means, or instructions for preparing to switch from monitoring the first bandwidth with the receiver to monitoring the second bandwidth with the receiver.

Some examples of the method, apparatus, and non-transitory computer-readable medium described above may further include processes, features, means, or instructions for receiving, based at least in part on the grant, a first portion of the data transmission in the first bandwidth during the first part of the TTI prior to switching to monitoring the second bandwidth in the second part of the TTI.

Some examples of the method, apparatus, and non-transitory computer-readable medium described above may further include processes, features, means, or instructions for decoding the control message during the first part of the TTI. Some examples of the method, apparatus, and non-transitory computer-readable medium described above may further include processes, features, means, or instructions for preparing to switch from monitoring the first bandwidth with the receiver to monitoring the second bandwidth with the receiver during the first part of the TTI.

Some examples of the method, apparatus, and non-transitory computer-readable medium described above may further include processes, features, means, or instructions for receiving an indication of a duration to receive the first portion of the data transmission in one or both of the grant, or a radio resource control message, or a message broadcast to a plurality of wireless devices.

In some examples of the method, apparatus, and non-transitory computer-readable medium described above, the data transmission may be received in a physical downlink shared channel (PDSCH).

Some examples of the method, apparatus, and non-transitory computer-readable medium described above may further include processes, features, means, or instructions for receiving the data transmission in the second bandwidth during the TTI, wherein the grant may be received in a previous TTI.

Some examples of the method, apparatus, and non-transitory computer-readable medium described above may further include processes, features, means, or instructions for receiving, in the first bandwidth during the TTI, a control message that includes a grant of downlink data transmission resources of a second TTI, wherein the second TTI follows the TTI.

In some examples of the method, apparatus, and non-transitory computer-readable medium described above, the TTI may be in a first transmit opportunity. In some examples of the method, apparatus, and non-transitory computer-readable medium described above, the previous TTI may be in a previous transmit opportunity.

Some examples of the method, apparatus, and non-transitory computer-readable medium described above may further include processes, features, means, or instructions for performing a first CCA during an intermediate TTI based at least in part on receiving the grant, wherein the intermediate TTI may be after the previous TTI and before the TTI. Some examples of the method, apparatus, and non-transitory computer-readable medium described above may further include processes, features, means, or instructions for determining that the second bandwidth may be occupied during the intermediate TTI based at least in part on the first CCA. Some examples of the method, apparatus, and non-transitory computer-readable medium described above may further include processes, features, means, or instructions for determining that the second bandwidth may be clear during the TTI, wherein determining to monitor the second bandwidth during the TTI may be based at least in part on determining that the second bandwidth may be clear during the TTI. Some examples of the method, apparatus, and non-transitory computer-readable medium described above may further include processes, features, means, or instructions for preparing to switch from monitoring the first bandwidth with the receiver to monitoring the second bandwidth with a wideband receiver during the first part of the TTI.

Some examples of the method, apparatus, and non-transitory computer-readable medium described above may further include processes, features, means, or instructions for determining, during a second TTI, that the wireless device may have not received a second grant for resources. Some examples of the method, apparatus, and non-transitory computer-readable medium described above may further include processes, features, means, or instructions for entering a DRX mode based at least in part on determining that the wireless device may have not received the second grant for resources.

DETAILED DESCRIPTION

Monitoring most or all carriers of a system bandwidth in a system supporting carrier aggregation (e.g., a wideband system such as an enhanced component carrier (eCC) or multicarrier system) may result in excessive power consumption. Transmissions directed to a user equipment (UE) may not span the entire system bandwidth, or may not be present in a given time period. In one example, a UE may monitor several carriers in the system bandwidth for a grant even though a grant may be scheduled for the UE on a single carrier. For more efficient power utilization, a UE may monitor a portion of a system bandwidth (e.g., a narrow bandwidth (narrowband) or an anchor carrier) of a system bandwidth (e.g., a wideband including a number of carriers). For example, a UE may switch to monitoring the entirety of the system bandwidth (e.g., using a wideband receiver) after first receiving an indication that a data transmission from a base station will span more than the monitored subset of the system bandwidth (e.g., the monitored narrowband or the anchor carrier). In some cases a UE may monitor for a grant using a narrowband receiver and subsequently open or power up wideband receiver circuitry of the UE's receiver according to information indicated by the grant. For example, a grant may indicate one or more carriers within the system bandwidth will contain data for a UE during a portion or all of an indicated transmission time interval (TTI). The grant may indicate downlink data transmission resources for the UE in the current TTI, or in a subsequent TTI. In some cases a base station may schedule a gap between the grant and the data transmission associated with the downlink data transmission resources to allow processing time for the UE to decode the grant and switch the UE receiver circuitry from receiving on narrowband to receiving on wideband. In other cases, the base station may schedule data transmissions on the same carrier as the grant (e.g., on the carrier monitored by the UE) during the time period after the grant but prior to the data transmission that spans the system bandwidth. Alternatively, the base station may send cross TTI and/or cross transmission opportunity (TxOP) downlink grants in a prior TTI for data transmissions to occur in later TTIs and/or later TxOPs.

Aspects of the disclosure are initially described in the context of a wireless communications system. Examples of wireless systems and downlink transmission configurations supporting efficient power utilization for eCCs are then described. Aspects of the disclosure are further illustrated by and described with reference to apparatus diagrams, system diagrams, and flowcharts that relate to efficient power utilization for eCCs.

Figure 1:
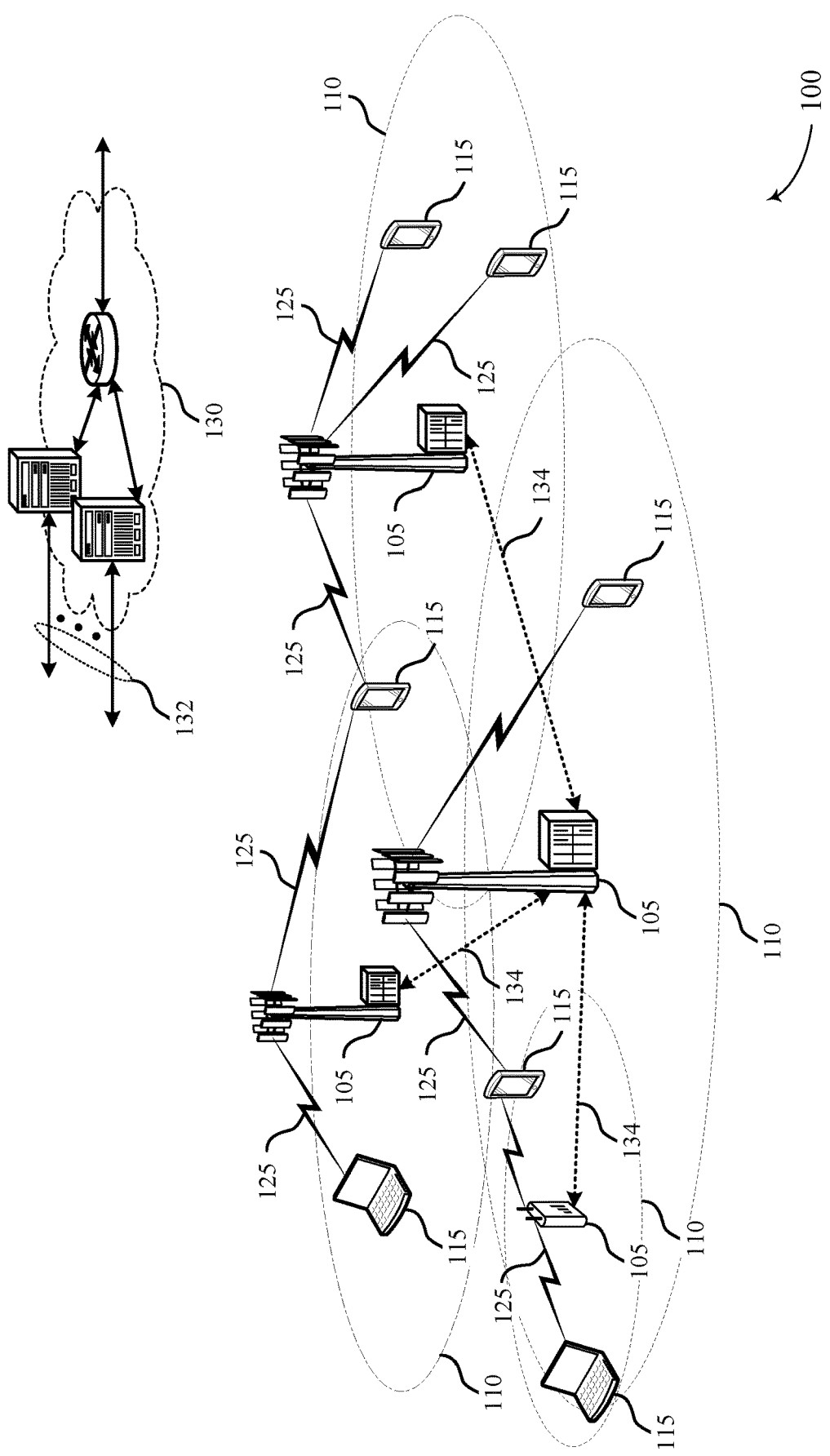
FIG. 1 illustrates an example of a system for wireless communication that supports efficient power utilization for enhanced component carriers (eCCs) in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. For example, wireless communications system 100 may include an LTE/LTE-A network, a MuLTEFire network, a neutral host small cell network, or the like, operating with overlapping coverage areas. A MuLTEFire network may include access points (APs) and/or base stations 105 communicating in an unlicensed radio frequency spectrum band, e.g., without a licensed frequency anchor carrier. For example, the MuLTEFire network may operate without an anchor carrier in the licensed spectrum. In some cases, wireless communications system 100 may support enhanced broadband communications, ultra-reliable (i.e., mission critical) communications, low latency communications, and communications with low-cost and low-complexity devices. In some examples, a MuLTEfire communications system may support UE with coverage enhancement mode. Additionally, a MuLTEfire communications system may include and support different UE types. One UE type may be a legacy UE that may be deficient of capabilities related to a coverage enhancement mode. Additionally or alternatively, another UE type may be a MuLTEfire UE that may possess capabilities related to coverage enhancement mode.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an MTC device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for one or more multiple communication devices, which may be otherwise known as a UE.

In some cases, a wireless communications system 100 (e.g., a wideband system or a multicarrier system) may support communication between base stations 105 and UEs 115 over a system bandwidth using eCCs. The system bandwidth may include multiple carriers or subbands (e.g., control subbands) that each span a subset of the system bandwidth. A base station 105 may transmit data to a UE 115 over a subset of carriers included in the system bandwidth depending on, for example, a scheduling decision at a base station 105. In some cases, a wideband data transmission from a base station 105 may include data for multiple UEs 115. Further, a data transmission from a base station 105 to a UE 115 may be paired with a downlink grant or control message indicating an assignment of resources for downlink data transmission.

A base station 105 may transmit data over communication links 125 using a subset of carriers in a system bandwidth. Accordingly, a UE 115 may monitor the system bandwidth for data from a base station 105 across one or more carriers using, for example, wideband receiver circuitry. In some cases, a base station 105 may transmit a downlink grant and data simultaneously to a UE 115. In some examples, base station 105 may transmit the downlink grant using a narrowband, or a single carrier over a smaller bandwidth than the data transmission bandwidth. In such examples, consistent monitoring of the system bandwidth (e.g., a larger bandwidth) for the data transmission using wideband receiver circuitry may be associated with increased or high power consumption. A UE 115 that supports narrowband monitoring for a downlink grant, while still configured to switch to a wideband for receipt of data transmissions in a wideband based on the downlink transmission resources specified by the grant, may save significant power.

In some cases, a UE 115 or base station 105 may operate in a shared or unlicensed frequency spectrum. These devices may perform a listen-before-talk (LBT) procedure, such as a clear channel assessment (CCA), prior to communicating in order to determine whether the channel is available. A CCA may include an energy detection procedure to determine whether there are any other active transmissions using a particular channel of the shared radio frequency spectrum band. For example, the device may infer that a change in a received signal strength indication (RSSI) of a power meter indicates that a channel is occupied. Specifically, signal power that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence, which may indicate that the channel is occupied and may also indicate a time period associated with transmissions of the other device.

In some cases, wireless communications system 100 may utilize one or more eCCs, for example a single or small number of eCCs in a narrowband an greater or large number of eCCs in a wideband. An eCC may be characterized by one or more features including flexible bandwidth, different TTIs, and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator is licensed to use the same spectrum).

An eCC characterized by flexible bandwidth may include one or more segments that may be utilized by UEs 115 that are not capable of monitoring the whole bandwidth or prefer to use a limited bandwidth (e.g., to conserve power). In some cases, an eCC may utilize a different TTI length than other component carriers (CCs), which may include use of a reduced or variable symbol duration as compared with TTIs of the other CCs. The symbol duration may remain the same, in some cases, but each symbol may represent a distinct TTI.

In some examples, an eCC may support transmissions using different TTI lengths. For example, some CCs may use uniform 1 ms TTIs, whereas an eCC may use a TTI length of a single symbol, a pair of symbols, or a slot, etc. In some cases, a shorter symbol duration may also be associated with increased subcarrier spacing. In conjunction with the reduced TTI length, an eCC may utilize dynamic time division duplex (TDD) operation (e.g., it may switch from DL to UL operation for short bursts according to dynamic conditions). Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency-division multiplexing (FDM) scheduling to accommodate flexible bandwidth use.

In some examples, a base station 105 may reserve a channel in the shared radio frequency spectrum band through a LBT procedure performed by base station 105 for a duration of time associated with a TxOP. The TxOP may, for example, correspond to a duration of a radio frame, in which the radio frame may include both downlink transmissions from the base station 105 to UE 115 as well as uplink transmissions from the UE 115 to the base station 105.

In some cases, a UE 115 may monitor a communication link 125 continuously for an indication that the UE 115 may receive data. In other cases (e.g., to conserve power and extend battery life), a UE 115 may be configured with a discontinuous reception (DRX) cycle. A DRX cycle may include an "On Duration" when the UE 115 may monitor for control information (e.g., on PDCCH) and a "DRX period" when the UE 115 may power down radio components. In some cases, a UE 115 may be configured with a short DRX cycle and a long DRX cycle. In some cases, a UE 115 may enter a long DRX cycle if it is inactive for one or more short DRX cycles. The transition between the short DRX cycle, the long DRX cycle and continuous reception may be controlled by an internal timer or by messaging from a base station 105. A UE 115 may receive scheduling messages on PDCCH during the On Duration. While monitoring PDCCH for a scheduling message, the UE 115 may initiate a "DRX Inactivity Timer." If a scheduling message is successfully received, the UE 115 may prepare to receive data and the DRX Inactivity Timer may be reset. When the DRX Inactivity Timer expires without receiving a scheduling message, the UE 115 may move into a short DRX cycle and may start a "DRX Short Cycle Timer." When the DRX Short Cycle Timer expires, the UE 115 may resume a long DRX cycle.

Wireless communications system 100 may support a Radio Resource Control (RRC) protocol that handles the Layer 3 control plane signaling by which the E-UTRAN controls the UE behavior. The RRC protocol supports the transfer of both common and dedicated Non-Access Stratum information. It covers a number of functional areas including System Information (SI) broadcasting, connection control including handover within LTE, network-controlled inter-Radio Access Technology (RAT) mobility and measurement configuration and reporting. See 3GPP TS36.300 Section 7 and TS36.331.

Figure 2:
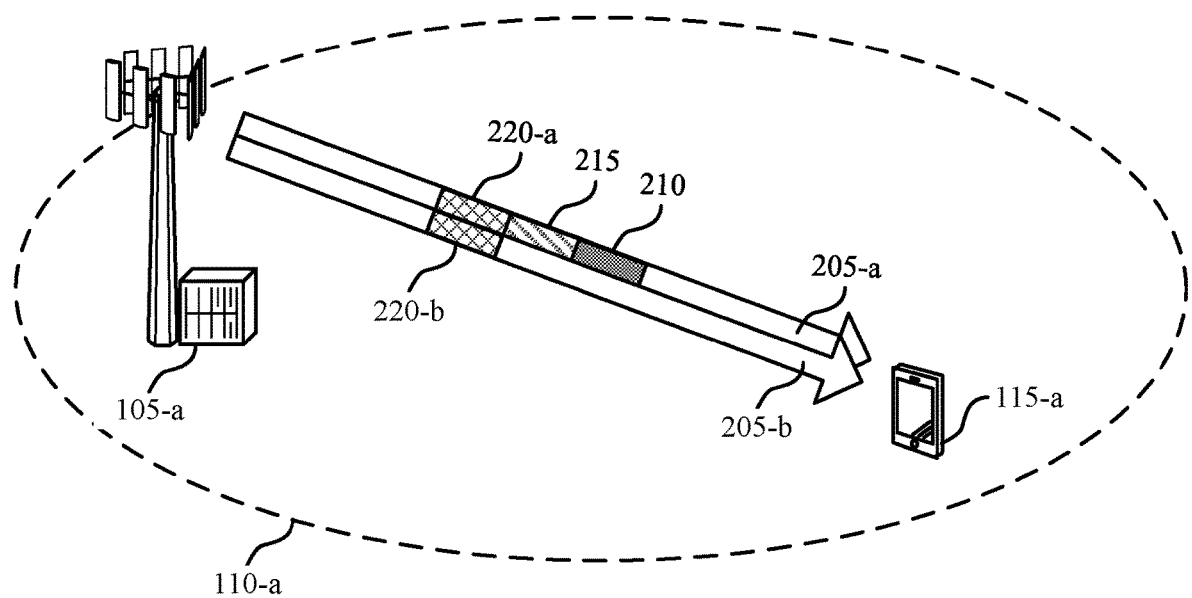
FIG. 2 illustrates an example of a wireless communication system that supports efficient power utilization for eCCs in accordance with aspects of the present disclosure.

FIG. 2 illustrates an example of a wireless communications system 200 for efficient power utilization for eCCs. A UE 115-a may monitor a reduced subset of the system bandwidth (e.g., an anchor carrier or carrier 205-a, transmitted in narrowband) for more efficient power utilization. UE 115-a may then switch to monitoring the entirety of the system bandwidth (e.g., carrier 205-a and carrier 205-b using wideband receiver circuitry) after first receiving an indication that a data transmission from a base station 105-a will span more than the monitored subset of the system bandwidth (e.g., carrier 205-a). That is, UE 115-a may monitor a subset of the system bandwidth (e.g., carrier 205-a) for a downlink grant 210 that may indicate a TTI and a radio frequency range associated with a data transmission from a base station 105-a. An anchor carrier (e.g., carrier 205-a) may be a predetermined narrowband or a predetermined single carrier in a frame or TTI. In some cases, an anchor carrier may refer to a control subband. In some examples, UE 115-a may power off wideband receiver circuitry and power on narrowband receiver circuitry to monitor for the downlink grant 210. In some cases, some of the narrowband receiver circuitry may be shared with the wideband receiver circuitry and may not be powered down along with the remainder of the narrowband receiver. However, the circuitry associated with wideband monitoring, which may be the majority of the circuitry, may be powered down when switching to monitoring narrowband frequencies with the narrowband receiver circuitry, thus significantly reducing power consumption.

After processing and decoding the downlink grant 210, UE 115-a may power on wideband receiver circuitry to receive data over a wideband of radio frequencies (e.g., over both carrier 205-a and other carriers, including carrier 205-b). Accordingly, base station 105-a may schedule time for UE 115-a to process and decode the downlink grant 210, prepare the receiver circuits to switch from narrowband receiver circuitry to wideband receiver circuitry, and switch the receiver circuitry. In wireless communications system 200, block 215 may represent the time scheduled by the base station 105-a for UE 115-a. In some cases, block 215 may be a time gap (e.g., void of downlink transmission) between a downlink grant 210 and a data transmission 220 to allow time for UE 115-a to process and decode the downlink grant 210 as well as prepare to use and switch on wideband receiver circuitry. Additionally or alternatively, block 215 may represent one or more data transmissions over the narrowband or anchor carrier subsequent to the downlink grant 210 to allow time for UE 115-a to process the downlink grant 210 and switch receiver circuitry, while receiving a first set of data in block 215 (e.g., using the narrowband receiver circuitry already powered to monitor for and receive the downlink grant 210). In some examples block 215 may represent a first portion of a physical downlink shared channel (PDSCH). In some example, while UE 115-a is receiving the first set of data in block 215, UE 115-a may process and decode the downlink grant 210 and/or prepare to switch on the wideband receiver circuitry. In still other examples, other data or control signals may be received during block 215 while the downlink grant 210 is decoded and/or the UE 115-a prepares to switch on its wideband receiver circuitry. Further, base station 105-a may transmit a downlink grant 210 in an earlier TTI that indicates information associated with a data transmission in a subsequent TTI. In such cases, block 215 may represent the time between the earlier TTI and the subsequent TTI.

In some examples, base station 105-a may configure UE 115-a to monitor a single carrier 205-a (e.g., an anchor carrier or a control subband) in a frame or TTI for a downlink grant 210 indicating an assignment of resources. In other examples, base station 105-a may not configure UE 115-a to monitor any carrier. In such cases, UE 115-a may enter a DRX mode in a frame or TTI and may monitor subsequent frames or TTIs periodically. Base station 105-a may also configure different UEs 115 to monitor different carriers or control subbands for downlink grants 210, such that different UEs 115 may have different anchor carriers that they monitor for grants of downlink data transmission resources. For example, a single carrier may not be able to support downlink grant transmission for all the UEs 115 in a wideband system. In some cases, UE 115-a may initially monitor a predetermined carrier or the full system bandwidth for a control message which may contain a grant 210 and/or an indication of an anchor carrier for future monitoring of grants 210.

Base station 105-a may schedule a gap 215 between a downlink grant 210 and a data transmission 220 to allow processing time at UE 115-a. In some cases, the gap 215 between the downlink grant 210 transmission and the data transmission 220 may not include any communication between base station 105-a and UE 115-a. The duration of the gap 215 may allow time for UE 115-a to process the downlink grant 210 and switch to wideband monitoring (e.g., power additional receiver circuitry). In some cases, the gap 215 may be between the downlink grant 210 and a data transmission 220 in a system that uses time division multiplexing (TDM). Accordingly, UE 115-*a* may process the downlink grant 210 and determine to monitor a wideband (e.g., carrier 205-*a* and carrier 205-*b*) for a data transmission 220 based on the downlink grant.

In other examples, base station 105-*a* may transmit a first portion of PDSCH data 215 on the narrowband (e.g., carrier 205-*a*) monitored by the UE 115-*a* between a downlink grant 210 and a second portion of the PDSCH data transmission 220. The duration of the transmission of the first portion of the PDSCH data 215 may allow time for UE 115-*a* to process the downlink grant 210 and switch or prepare to switch to wideband monitoring. In some cases, the duration of the first portion of the PDSCH data transmission 215 may be signaled in the downlink grant 210, in radio resource control (RRC) configuration, or broadcast to UEs in a wideband system. Base station 105-*a* may indicate the first portion of the PDSCH data transmission 215 in the downlink grant 210 and transmit this first data transmission 215 over the narrowband (e.g., carrier 205-*a*) monitored by UE 115-*a*. After processing the downlink grant 210, UE 115-*a* may determine that the subsequent data transmission 220 indicated in the downlink grant 210 may cover a similar narrowband (e.g., carrier 205-*a*) or may cover all or portions of a wideband (e.g., carrier 205-*a* and carrier 205-*b*) (e.g., a system bandwidth). The second portion of the PDSCH data transmission 220 may then be received over the system bandwidth (e.g., over carrier 205-*a* and carrier 205-*b* via wideband receiver circuitry).

Additionally or alternatively, UE 115-*a* may receive a cross TTI downlink grant 210 or a cross TxOP downlink grant 210 for a data transmission 220 included in a subsequent TTI. As such, the time between an earlier TTI and a later TTI may allow time for UE 115-*a* to process the downlink grant 210 and switch to wideband monitoring. For example, base station 105-*a* may transmit a downlink grant 210 in a first TTI (e.g., TTI 1) that indicates information associated with a data transmission 220 included in a later TTI (e.g., TTI 2). Accordingly, UE 115-*a* may monitor for and receive data in a TxOP based on a downlink grant 210 received in a previous TTI. For example the received grant may indicate a set of carriers within the system bandwidth that carry data transmissions.

Figure 3:
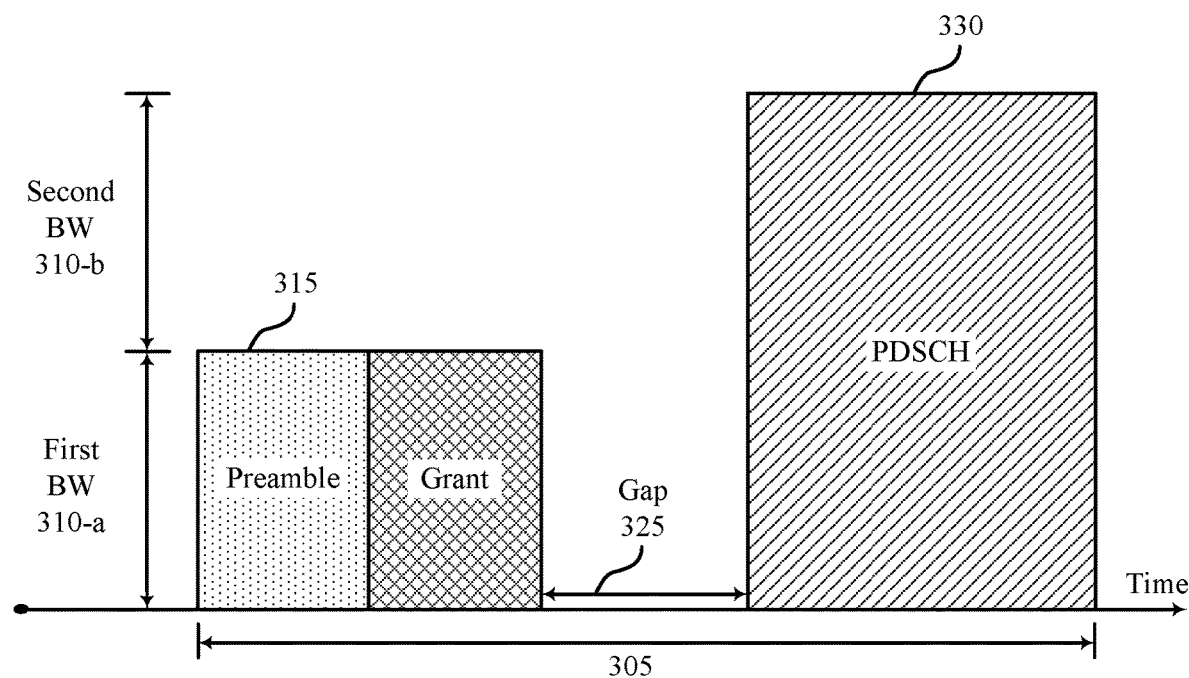
FIGS. 3 through 5 illustrates an example of a downlink transmission configuration that supports efficient power utilization for eCCs in accordance with aspects of the present disclosure.

FIG. 3 illustrates an example of a downlink transmission configuration 300 for efficient power utilization for eCCs. In the example of FIG. 3, a base station 105 may schedule a gap between a downlink grant and a data transmission to allow processing time at a UE 115.

In some cases, a base station 105 may communicate with a UE 115 over a time duration 305. The time duration 305 may represent a TTI or some other time duration (e.g., a TxOP, etc.). Time duration 305, which may for example represent a TTI, may also begin prior to preamble 315 or end subsequent to PDSCH data 330.

In the present example, the base station 105 may communicate with the UE 115 over a system bandwidth (e.g., first bandwidth 310-*a* and second bandwidth 310-*b*) using a single carrier (e.g., a narrowband or first bandwidth 310-*a*) or multiple carriers (e.g., the system bandwidth or a subset of the system bandwidth) for at least the time duration 305.

That is, a base station 105 may transmit data to a UE 115 over a first bandwidth 310-*a*, and the UE 115 may monitor the first bandwidth 310-*a* using, for example, narrowband receiver circuitry. Further, a base station 105 may transmit data over both a first bandwidth 310-*a* and a second bandwidth 310-*b*. In such examples, the UE 115 may monitor the system bandwidth (e.g., the first bandwidth 310-*a* and the second bandwidth 310-*b*) using, for example, wideband receiver circuitry of a receiver or transceiver of UE 115.

The base station 105 may transmit a preamble 315 to the UE 115 to synchronize transmission timing with the UE 115. In some cases, the base station 105 may transmit the preamble 315 using a narrowband or a single carrier (e.g., an anchor carrier). The UE 115 may monitor the single carrier using, for example, narrowband receiver circuitry, and the UE 115 may receive and decode the preamble 315 and interpret the synchronization information included in the preamble 315. In some cases, the UE 115 may be equipped with wideband receiver circuitry that may be in a powered off state. In some cases, the UE 115 may be preconfigured (e.g., by a base station 105 using RRC signaling or other configuration signaling) to monitor the carrier (e.g., anchor carrier) on which the preamble is received.

Base station 105 may then transmit a downlink grant 320 to the UE 115 to indicate an assignment of resources for communication with the UE 115 (e.g., downlink resources). In some cases, the base station 105 may transmit the downlink grant 320 using a narrowband or a single carrier. The UE 115 may monitor the single carrier using, for example, narrowband receiver circuitry, and the UE 115 may receive and decode the downlink grant 320 and identify a resource assignment associated with a downlink transmission for the UE 115. Downlink grant 320 may also include resource assignments for other UEs 115. In some cases, the resource assignment may indicate time and frequency resources such as a TTI, or a portion of a TTI, and a range of radio frequencies associated with a subsequent downlink data transmission for the UE 115. In some examples, the UE 115 may power off a narrowband receiver and power on a wideband receiver based on the resource assignment indicated in the downlink grant 320.

Accordingly, the base station 105 may allow time for the UE 115 to process and decode the downlink grant 320. Additionally, a downlink grant 320 may indicate that the base station 105 may transmit data over multiple carriers or a wideband of radio frequencies. In such cases, the base station 105 may schedule time for the UE 115 to prepare its receiver to switch from using narrowband receiver circuitry to wideband receiver circuitry. For example, the base station 105 may schedule a gap 325 between the downlink grant 320 and a wideband data transmission to allow time for the UE 115 to process and decode the downlink grant, prepare the receiver circuits for switching, and prepare to and/or switch from using narrowband receiver circuitry to monitor a narrowband to wideband receiver circuitry to monitor a wideband. The gap 325 between the downlink grant 320 and the data transmission may be void of communications between the base station 105 and the UE 115. In some cases, the duration of the gap 325 may be signaled by the base station 105 to the UE 115 in a RRC configuration at the beginning of radio link setup.

The base station 105 may then transmit downlink data (e.g., PDSCH data 330) over multiple carriers or a wideband of radio frequencies (e.g., first bandwidth 310-*a* and second bandwidth 310-*b*). The gap 325 may allow sufficient time for the UE 115 to process and decode the downlink grant, prepare the receiver circuits to switch from narrowband monitoring to wideband monitoring, and switch the receiver circuitry. Subsequently, the UE 115 may receive the PDSCH data 330 over the multiple carriers or wideband using the wideband receiver circuitry. In some examples, the multiple carriers may be adjacent to one another. In other examples, one or more of the multiple carriers may be separated by carriers not covered by (e.g., included in) the grant. In either example, the UE 115 may monitor the multiple carriers as indicated by the grant via a wideband receiver.

Figure 4:
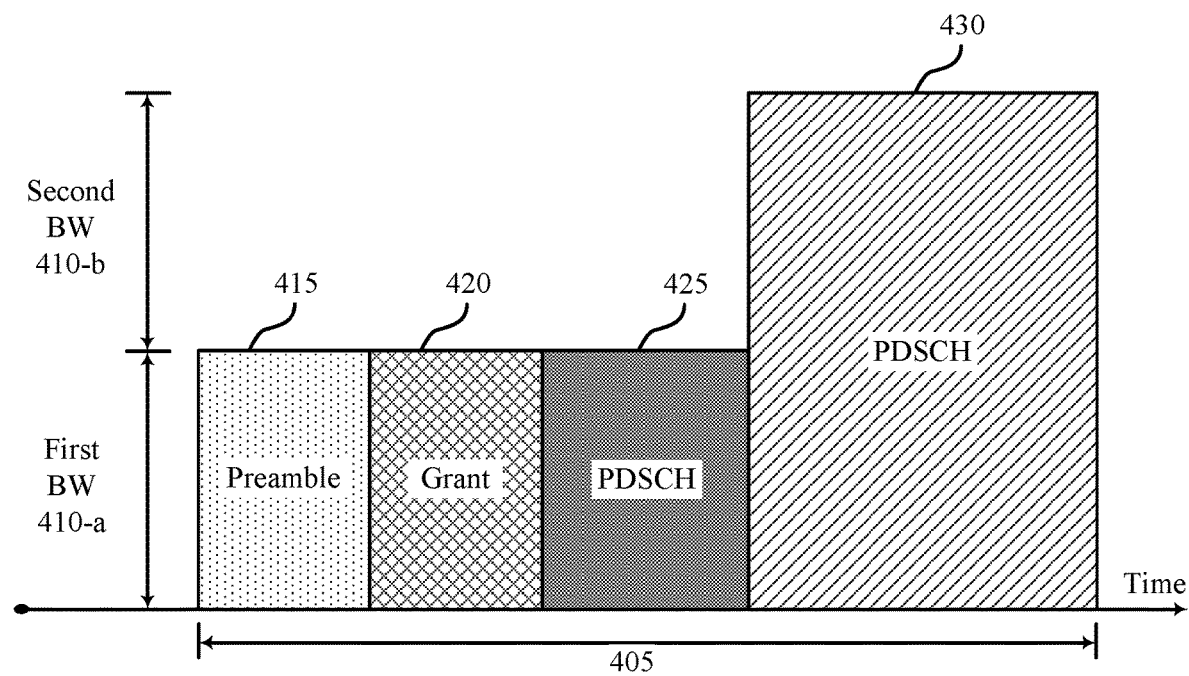

FIG. 4 illustrates an example of a downlink transmission configuration 400 for efficient power utilization for eCCs. In the example of FIG. 4, a base station 105 may transmit a first portion of PDSCH data on the narrowband monitored by a UE 115 between a downlink grant and a second portion of PDSCH data.

In some cases, a base station 105 may communicate with a UE 115 over a time duration 405. The time duration 405 may represent a TTI or some other time duration (e.g., a TxOP, etc.).

The base station 105 may communicate with the UE 115 over a system bandwidth 410 (e.g., first bandwidth 310-a and second bandwidth 310-b) using a single carrier (e.g., a narrowband or first bandwidth 410-a) or multiple carriers (e.g., the system bandwidth or a subset of the system bandwidth) for at least the time duration 405. That is, a base station 105 may transmit data to a UE 115 over a first bandwidth 410-a, and the UE 115 may monitor the first bandwidth 410-a using, for example, narrowband receiver circuitry. In other examples, the base station 105 may transmit data over a first bandwidth 410-a and a second bandwidth 410-b. In such examples, the UE 115 may monitor the system bandwidth (e.g., the first bandwidth 410-a and one or more other bandwidths, including the second bandwidth 410-b) using, for example, wideband receiver circuitry.

The base station 105 may transmit a preamble 415 to the UE 115 to synchronize transmission timing with the UE 115. In some cases, the base station 105 may transmit the preamble 415 using a narrowband or a single carrier (e.g., an anchor carrier). The UE 115 may monitor the single carrier using, for example, narrowband receiver circuitry, and the UE 115 may receive and decode the preamble 415 and interpret the synchronization information included in the preamble 415. In some cases, the UE 115 may be equipped with wideband receiver circuitry that may be in a powered off state. In some cases, the UE 115 may be preconfigured to monitor the carrier (e.g., anchor carrier) on which the preamble is received.

The base station 105 may then transmit a downlink grant 420 to the UE 115 to indicate an assignment of resources for communication with the UE 115 (e.g., downlink resources). In some cases, the base station 105 may transmit the downlink grant 420 using a narrowband or a single carrier. The UE 115 may monitor the single carrier using, for example, narrowband receiver circuitry, and the UE 115 may receive and decode the downlink grant 420 and identify a resource assignment associated with a downlink transmission. In some cases, the resource assignment may indicate a TTI, or a portion of a TTI, and a range of radio frequencies associated with a subsequent downlink transmission. In some examples, the UE 115 may power off a narrowband receiver and power on a wideband receiver based on the resource assignment indicated in the downlink grant 420. In other examples, some of the narrowband receiver circuitry may be the same as the wideband receiver circuitry and may not be powered down, but additional circuitry may be powered to enable reception on the wideband of frequencies indicated in the downlink grant 420.

Accordingly, base station 105 may schedule time for the UE 115 to process and decode the downlink grant 420. Additionally, the downlink grant 420 may indicate that the base station 105 may transmit data over multiple carriers or a wideband of radio frequencies. In such cases, the base station 105 may schedule time, or otherwise allow time, for the UE 115 to prepare the receiver circuits to switch from a narrowband receiver to a wideband receiver, and switch the receiver circuits from a narrowband receiver to a wideband receiver. For example, the base station 105 may transmit a first PDSCH data portion 425 over a single carrier or a narrowband (e.g., over the anchor carrier the control message or grant is received on by the UE 115) between the downlink grant 420 and a wideband data transmission to allow time for the UE 115 to process and decode the downlink grant, prepare the receiver circuits for switching, and switch from narrowband receiver circuitry to wideband receiver circuitry. In some cases, the first PDSCH data portion 425 may be associated with a second PDSCH data portion (e.g., PDSCH data 430) that a base station 105 may transmit over multiple carriers or a wideband.

The base station 105 may then transmit PDSCH data 430 (e.g., a second PDSCH data portion) over multiple carriers or a wideband of radio frequencies (e.g., first bandwidth 410-a and second bandwidth 410-b). The transmission of the first PDSCH data portion 425 (e.g., on the narrowband or the anchor carrier) may allow sufficient time for the UE 115 to process and decode the downlink grant, prepare the receiver circuits to switch from narrowband monitoring to wideband monitoring, and switch the receiver circuitry (e.g., while receiving the first PDSCH data portion 425 via active narrowband receiver circuitry). Subsequently, the UE 115 may receive the PDSCH data 430 over the multiple carriers or wideband using the wideband receiver circuitry. In some cases, the multiple carriers may be adjacent to one another, in other cases, the multiple carriers may be separated by carriers not indicated by the grant. In either case, the UE 115 may monitor the multiple carriers as indicated by the grant via a wideband receiver. In some cases, first bandwidth 410-a may overlap with second bandwidth 410-b. Further, first bandwidth 410-a may be a portion of second bandwidth 410-b (e.g., as shown). Alternatively, first bandwidth 410-a and second bandwidth 410-b may not overlap in other scenarios.

Figure 5:
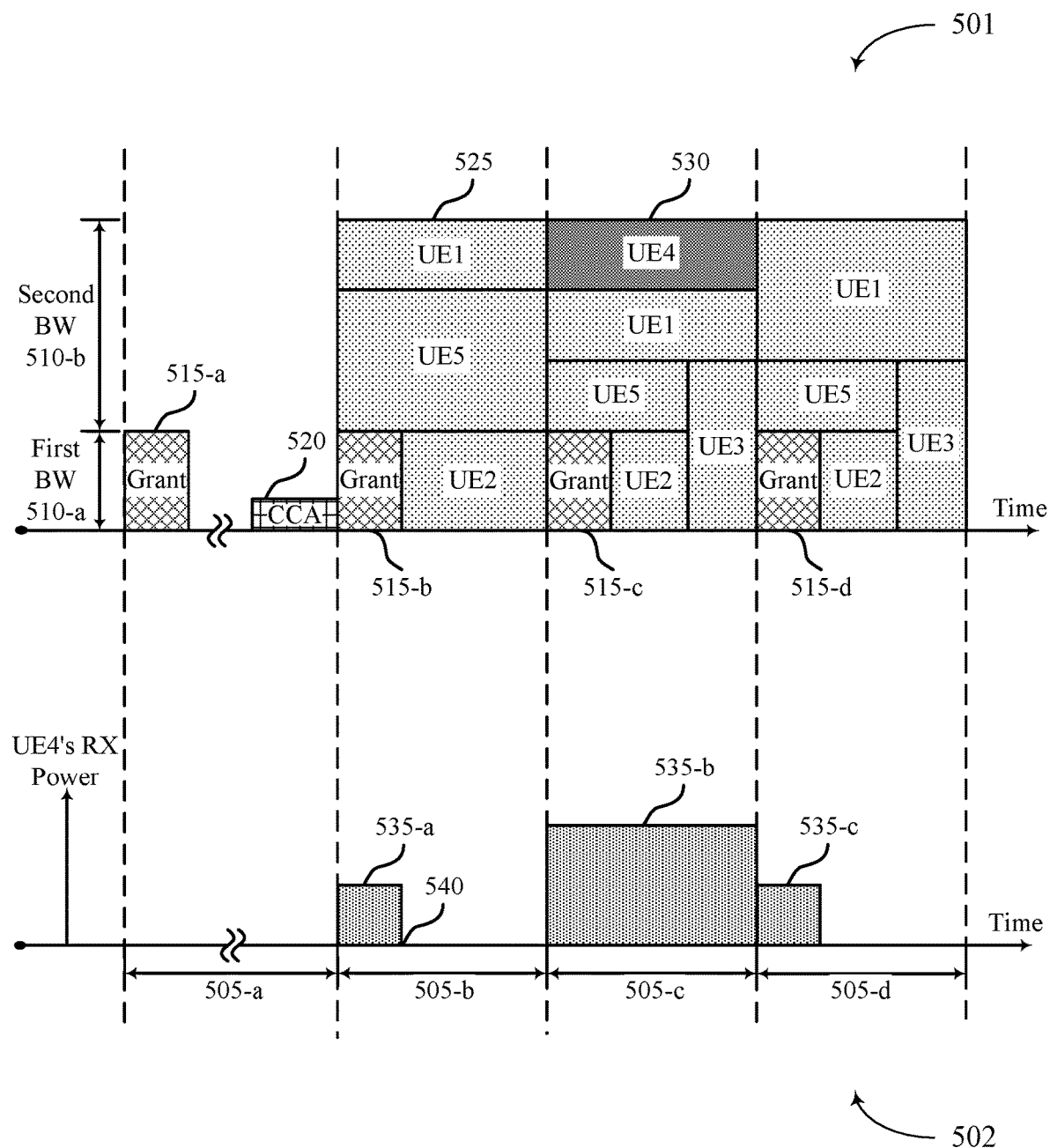

FIG. 5 illustrates an example of a downlink transmission configuration 501 and a receiver circuitry power consumption graph 502 for efficient power utilization for eCCs. In the example of FIG. 5, a UE may receive a cross TTI downlink grant or a cross TxOP downlink grant for a data transmission included in a subsequent TTI.

In some cases, downlink transmission configuration 501 may represent the perspective of a base station 105. The base station 105 may transmit downlink grants and data to multiple UEs 115 over a narrowband of radio frequencies (e.g., a single carrier or first bandwidth 510-a) or a wideband of radio frequencies (e.g., multiple carriers or both first bandwidth 510-a and second bandwidth 510-b) over a time duration (e.g., time durations 505-a through 505-d). In some examples, time durations 505-b through 505-d may each represent an individual TTI, a portion of a TTI, or some other duration of time. Time duration 505-a may represent a previous time duration in which a grant 515-a was received and a CCA 520 was performed, but may not necessarily correspond to the same time durations as time durations 515-b through 515-d.

In some examples, base stations 105 may transmit grants 515 and/or data to UEs 115 over a first bandwidth 510-a, and UEs 115 may monitor the first bandwidth 510-a using, for example, narrowband receiver circuitry. In other examples, base stations 105 may transmit data and/or grants to UEs 115 over both a first bandwidth 510-*a* and a second bandwidth 510-*b* (e.g., a wideband). In such examples, UEs 115 may monitor the system bandwidth (e.g., the first bandwidth 510-*a* and one or more other bandwidths including the second bandwidth 510-*b*) using, for example, wideband receiver circuitry.

A base station 105 may transmit a downlink grant 515 to multiple UEs 115 in a wireless communication system to indicate an assignment of resources for communication with each UE. In some cases, the base station 105 may transmit the downlink grant 515 using a narrowband or a single carrier (e.g., first bandwidth 510-*a*). The UEs 115 may monitor the first bandwidth 510-*a* using, for example, narrowband receiver circuitry, and the UEs 115 may receive and decode the downlink grants 515 and identify a resource assignment associated with a subsequent downlink transmission. Downlink grants 515-*b* through 515-*d* may indicate resource assignments associated with data transmissions in a subsequent time duration. For example, downlink grant 515-*b* may indicate resource assignments associated with a data transmission in time duration 505-*c*. In some examples, a base station 105 may transmit a downlink grant 515-*a* in a previous time duration 505-*a* that may or may not immediately precede the associated data transmission (e.g., data transmissions over UE4 resources 530 or other UE resources 525).

In such cases, the base station 105 may perform a CCA 520 on channels used to communicate with UEs 115. In the case of a CCA failure, a base station may postpone a data transmission to the UE 115. Once the base station 105 determines that a CCA (e.g., CCA 520) has passed, the base station 105 may transmit data to the UE 115 over the channel. The UE 115 may then use the resources indicated in the downlink grant 515 to receive the data transmission from the base station 105. That is, the downlink grant 515 may apply to a subsequent downlink transmission irrespective of the time the data transmission is received by UE 115. That is, grant 515-*a* may indicate an assignment of downlink resources for transmissions that are not received by the intended UE 115 until after a CCA 520 procedure is successful. If a CCA 520 fails, the downlink transmissions associated with the grant 515-*a* may be received in a time duration 515 that follows a subsequent CCA 520 that is successful.

In some cases, the downlink grant 515 may indicate a resource assignment for multiple UEs (e.g., other UE resources 525 indicating resources for arbitrary UE1, UE2, UE3, and UE5) in a wideband system. In some cases, the downlink grant 515 may assign resources for a subset of the multiple UEs. For example, a downlink grant 515-*b* may assign resources for UE1, UE2, UE3, UE4, and UE5, whereas a downlink grant 515-*c* may assign resources for UE1, UE2, UE3, and UE5. A UE 115 may receive and decode a downlink grant 515 to determine if a base station 105 will transmit data to that UE 115 in a subsequent TTI. Additionally, UE 115 may determine if the downlink grant 515 indicates a data transmission over a narrowband or a wideband. Based on the determination, the UE 115 may power off narrowband receiver circuitry and power on wideband receiver circuitry to receive data over a wideband of radio frequencies. In some cases, some of the narrowband receiver circuitry may be the same as the wideband receiver circuitry and may not be powered down, but additional circuitry may be powered to enable reception on the wideband of frequencies.

In some cases, receiver circuitry power consumption graph 502 may represent the receiver power consumption perspective of a UE 115 (e.g., UE4). UE4 may power on narrowband receiver circuitry and power off additional circuitry associated with wideband monitoring to solely monitor for a downlink grant 515 from a base station 105 within a narrowband or anchor carrier. Power blocks 535 may represent an amount of power used, at a UE 115, to receive a downlink transmission. For example, a base station 105 may transmit a downlink grant 515-*b* and a UE 115 may receive the downlink grant and use the amount of power indicated in power block 535-*a* (e.g., the power associated with monitoring a narrowband). The UE 115 may process and decode the downlink grant 515-*b* and determine that a base station may transmit data in a subsequent time duration 505-*c*. The UE 115 may then power additional wideband receiver circuitry (e.g., the power associated with monitoring a wideband) to receive the data transmission (e.g., power block 535-*b*). In some examples, the UE 115 may receive the data transmission and use the amount of power indicated in power block 535-*b*. The data transmission may also be paired with a downlink grant 515-*c* from a base station 105. The UE 115 may process and decode the downlink grant 515-*c* and determine that a base station may not transmit data directed to it (e.g., UE4) in a subsequent time duration 505-*d*. As such, UE4 may power off the wideband receiver circuitry and power on narrowband receiver circuitry to monitor for a subsequent downlink grant 515-*d*.

When monitoring using narrowband receiver circuitry, the UE 115 may receive a downlink grant over a portion of a time duration 505-*b* (e.g., from the beginning of time duration 505-*b* to cutoff time 540). This portion of the time duration 505-*b* may be shorter than the time taken to receive a data transmission. For example, a UE 115 may receive a data transmission over the entirety of a time duration 505-*c*, whereas a UE 115 may receive a downlink grant over a portion of a time duration 505-*b* indicated by a cutoff time 540. The reduced receive time associated with a grant transmission when using narrowband receiver circuitry may further reduce the power consumption at UE4 as the narrowband receiver circuitry may be powered for power block 535-*a* that does not span the entire time duration 505-*b*.

Figure 6:
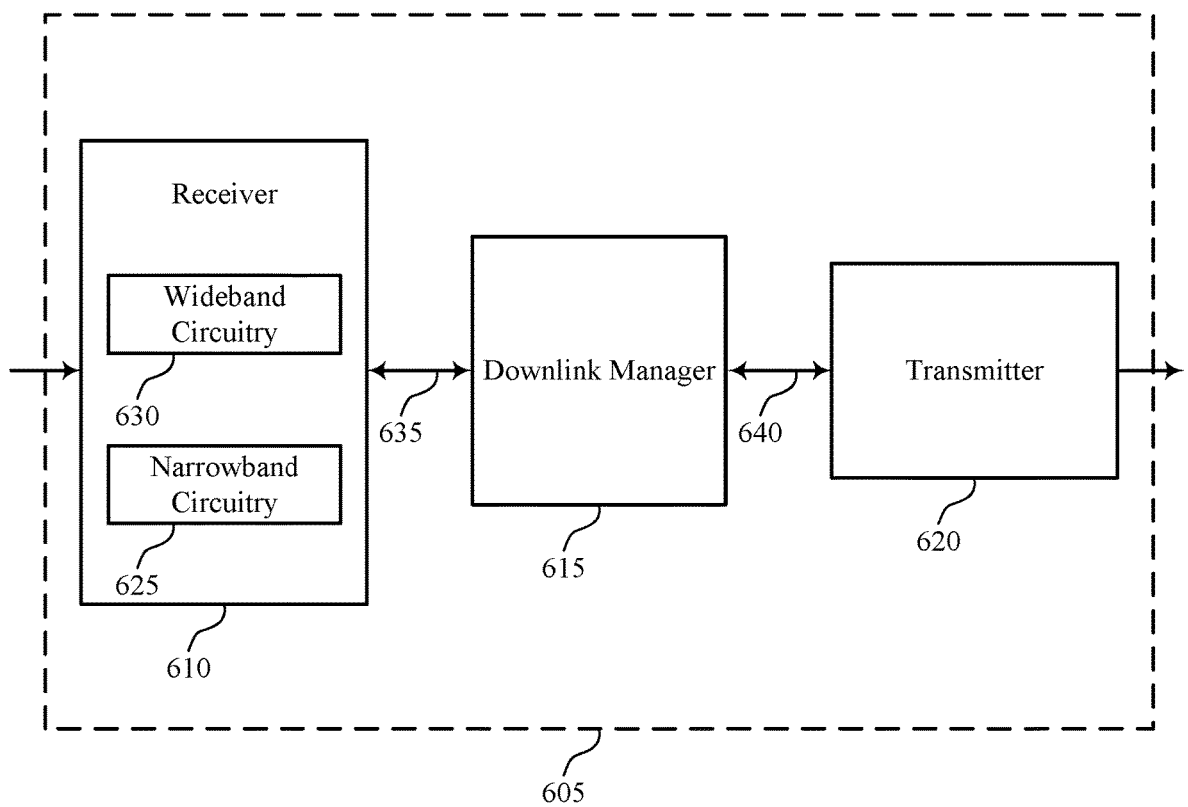
FIGS. 6 through 8 show diagrams of a device that supports efficient power utilization for eCCs in accordance with aspects of the present disclosure.

FIG. 6 shows a diagram 600 of a wireless device 605 that supports efficient power utilization for eCCs in accordance with various aspects of the present disclosure. Wireless device 605 may be an example of aspects of a UE 115 as described with reference to FIG. 1. Wireless device 605 may include receiver 610, downlink manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to efficient power utilization for eCCs, etc.). Information may be passed on to other components of the device via link 635. The receiver 610 may be an example of aspects of the transceiver 935 described with reference to FIG. 9. Receiver 610 may include wideband circuitry 630 and narrowband circuitry 625. Wideband circuitry 630 and narrowband circuitry 625 may enable the receiver 610 to monitor or receive wideband transmissions or narrowband transmissions respectively. In some cases, all or some of the circuitry of wideband circuitry 630 and narrowband circuitry 625 may be the same or shared. In other cases, wideband circuitry 630 and narrowband circuitry 625 may be part of separate components (e.g., two separate receivers 610).

Downlink manager 615 may be an example of aspects of the downlink manager 915 described with reference to FIG. 9. The Downlink manager 615 may receive information via link 635. For example, the information may include control messages received via narrowband circuitry 625 of receiver 610, data transmissions received via wideband circuitry 630 of receiver 610, etc. Downlink manager 615 may monitor a first bandwidth with a receiver of a wireless device and receive, in the first bandwidth, a control message that includes a grant of downlink data transmission resources for the wireless device. Downlink manager 615 may then determine to monitor a second bandwidth for a data transmission for the wireless device as specified by the grant (e.g., where the first bandwidth is a portion of the second bandwidth) and monitor the second bandwidth with the receiver for the data transmission during a TTI. For example, downlink manager 615 may power additional circuitry (e.g., wideband circuitry 630) of receiver 610 via link 635.

Transmitter 620 may transmit signals generated by other components of the device (e.g., transmit information received via link 640). In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas.

Figure 7:
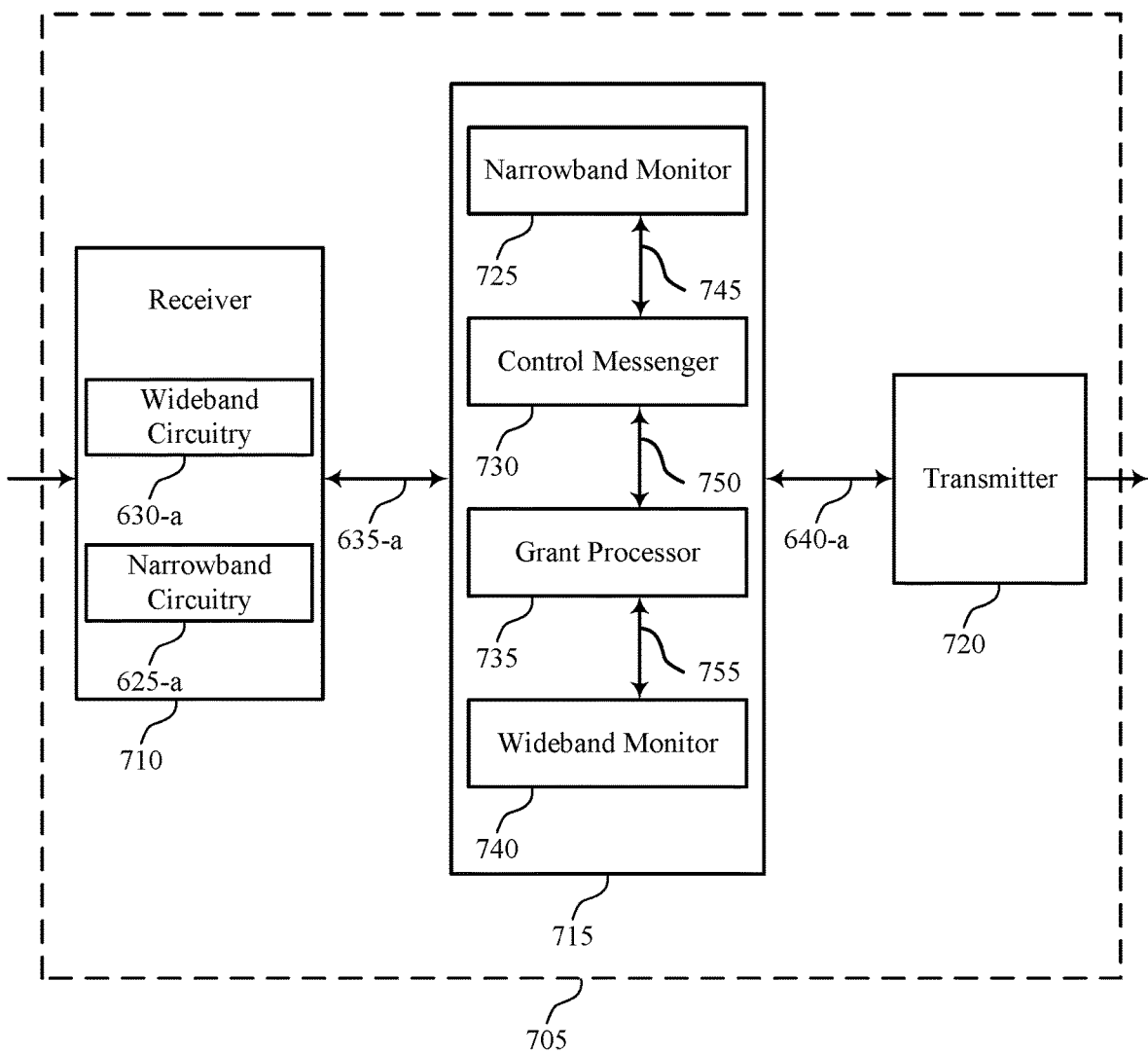

FIG. 7 shows a diagram 700 of a wireless device 705 that supports efficient power utilization for eCCs in accordance with various aspects of the present disclosure. Wireless device 705 may be an example of aspects of a wireless device 605 or a UE 115 as described with reference to FIGS. 1 and 6. Wireless device 705 may include receiver 710, downlink manager 715, and transmitter 720. Wireless device 705 may also include a processor. Each of these components may be in communication with one another (e.g., via one of links 635-*a*, 640-*a*, 745, 750, or 755).

Receiver 710 may receive information such as packets, user data, or control information associated with various information channels (e.g., control channels, data channels, and information related to efficient power utilization for eCCs, etc.). Information may be passed on to other components of the device via link 635-*a*. The receiver 710 may be an example of aspects of the transceiver 935 described with reference to FIG. 9. Further, the receiver 710 may be an example of aspects of the receiver 610 described with reference to FIG. 6, where the wideband circuitry 630-*a* and narrowband circuitry 625-*a* perform aspects of the functions of the wideband circuitry 630 and narrowband circuitry 625 also described with reference to FIG. 6.

Downlink manager 715 may be an example of aspects of the downlink manager 915 described with reference to FIG. 9. Downlink manager 715 may also include narrowband monitor 725, control message manager 730, grant processor 735, and wideband monitor 740.

Narrowband monitor 725 may monitor a first bandwidth with a receiver of a wireless device and monitor the first bandwidth includes monitoring the first bandwidth with a narrowband receiver circuit of the receiver. In some cases, the first bandwidth includes a narrowband portion of the wideband. In some cases, the first bandwidth includes an anchor carrier. In some examples, narrowband monitor 725 may employ narrowband circuitry 625-*a* to perform the described functions. In some cases, narrowband monitor 725 may receive information from narrowband circuitry 625-*a* of receiver 710 via link 635-*a*.

Control message manager 730 may then receive such information from narrowband monitor via link 745. The information may include a control message that includes a grant of downlink data transmission resources for the wireless device. In some case the control message includes a grant of downlink data transmission resources of a second TTI, where the second TTI follows a TTI monitored by narrowband monitor 725.

Grant processor 735 may receive information (e.g., a grant) from control message manager 730 via link 750. According to the information, grant processor 735 may determine to monitor a second bandwidth for a data transmission for the wireless device as specified by the grant. The first bandwidth may be a portion of the second bandwidth.

Wideband monitor 740 may monitor the second bandwidth with the receiver for the data transmission during a TTI. In some cases, monitoring the second bandwidth includes monitoring the second bandwidth with a wideband circuitry 630-*a* of the receiver 710. In some cases, the second bandwidth includes a wideband. Wideband monitor 740 may receive the data transmission (e.g., from the receiver 710 via link 635-*a*) in the second bandwidth during the TTI, where the grant associated with the data transmission is received in a previous TTI by grant processor 735. For example, grant processor 735 may send information (e.g., downlink resource information) to wideband monitor 740 via link 755, such that wideband monitor 740 may inform the receiver 710 (e.g., via link 635-*a*) to monitor for data transmissions according to the information (e.g., using wideband circuitry 630-*a*). Corresponding data transmissions received by receiver 710 may be passed to downlink manager 715 via link 635-*a* for processing. In some cases, the TTI is in a first transmit opportunity. In some cases, the previous TTI is in a previous transmit opportunity. In some cases, the second bandwidth includes one or more carriers. In some cases, the one or more carriers include the anchor carrier and one or more other carriers. In some examples, wideband monitor 740 may employ wideband circuitry 630-*a* to perform the described functions.

Transmitter 720 may transmit signals generated by other components of the device. For example, transmitter 720 may receive information to be transmitted from downlink manager 715 via link 640-*a*. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
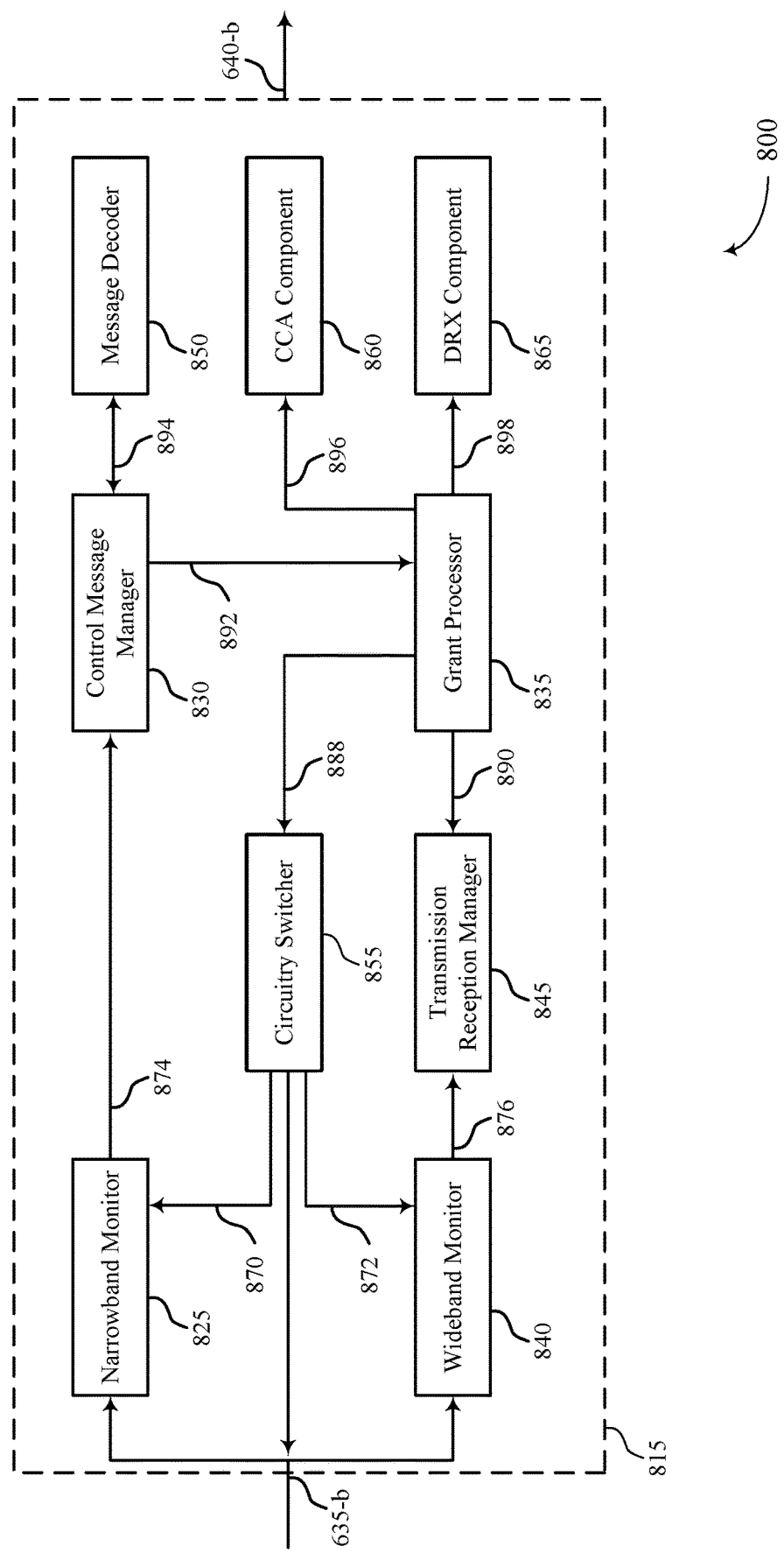

FIG. 8 shows a diagram 800 of a downlink manager 815 that supports efficient power utilization for eCCs in accordance with various aspects of the present disclosure. Downlink manager 815 may be an example of aspects of a wireless device 605, wireless device 705, or a UE 115 as described with reference to FIGS. 1, 6, and 7. Downlink manager 815 may be an example of aspects of a downlink manager 615, a downlink manager 715, or a downlink manager 915 described with reference to FIGS. 6, 7, and 9. In some cases, downlink manager 815 may refer to a processor. Downlink manager 815 may include narrowband monitor 825, wideband monitor 840, circuitry switcher 855, transmission reception manager 845, control message manager 830, grant processor 835, message decoder 850, CCA component 860, and DRX component 865. Each of these components may be in communication with one another (e.g., via one or more buses).

Downlink manager 815 may receive information from other components of a wireless device (e.g., from a receiver) via link 635-*b*, and may pass information to other components of a wireless device (e.g., to a transmitter) via link 640-*b*. Information may be received (e.g., via link 635-*b*) by narrowband monitor 825 and/or wideband monitor 840 depending on, for example, information received and circuitry used at the receiver. For example, narrowband monitor 825 may monitor a first bandwidth with a receiver (e.g., a narrowband receiver circuit of the receiver via link 635-*a*) of a wireless device. In some cases, the first bandwidth includes a narrowband portion of a wideband. In some cases, the first bandwidth includes an anchor carrier. Wideband monitor 840 may monitor the second bandwidth with the receiver (e.g., a wideband receiver circuit of the receiver via link 635-*a*) for the data transmission during a TTI. In some cases, the second bandwidth includes the wideband. In some cases, the second bandwidth includes one or more carriers. In some cases, the one or more carriers include the anchor carrier and one or more other carriers.

As an example, a wireless device may monitor (e.g., with a receiver) a first bandwidth for control messages. The narrowband monitor 825 of downlink manager 815 may receive such information via link 635-*b*. Control message manager 830 may then receive, via link 874, information such as a control message from narrowband monitor 825 that may include a grant of downlink data transmission resources for the wireless device. The control message manager 830 may receive such information via link 874 during a TTI, where the information includes a control message that includes a grant of downlink data transmission resources of a second TTI, where the second TTI follows the TTI.

The control message manager 830 may pass information directly to grant processor 835 via link 892. In some cases, control message manager 830 may first send information to message decoder 850 (e.g., via link 894), such that the message decoder 850 may decode the control message during the time gap and decode the control message during the first part of the TTI. The message decoder 850 may decode such information, and pass the information back to control message manger 830 via link 894, such that control message manager 830 may pass the decoded information on to grant processor 835 (e.g., via link 894). Grant processor 835 may determine to monitor a second bandwidth for a data transmission for the wireless device as specified by the information (e.g., the grant received via link 892). The first bandwidth may be a portion of the second bandwidth. Grant processor may forward information to circuitry switcher 855 via link 888. Circuitry switcher 855 may receive information from grant processor 835, including information associated with a received grant, and send information (e.g., a control signal, a command or request for the receiver to switch between monitoring with wideband circuitry 630 or narrowband circuitry 625, a command to power on or off wideband circuitry 630 and/or narrowband circuitry 625, etc.) to a receiver (e.g., via link 635-*b*), narrowband monitor 825 (e.g., via link 870), and/or wideband monitor 840 (e.g., via link 872). Circuitry switcher 855 may thus prepare to switch from monitoring the first bandwidth with the receiver to monitoring the second bandwidth with the receiver, prepare to switch from monitoring the first bandwidth with the receiver to monitoring the second bandwidth with the receiver during the first part of the TTI, and prepare to switch from monitoring the first bandwidth with the receiver to monitoring the second bandwidth with a wideband receiver during the first part of the TTI. That is, circuitry switcher may coordinate circuitry/receiver switching and downlink manager 815 monitoring by sending control information to the receiver, the narrowband monitor 825, and the wideband monitor 840.

The transmission reception manager 845 of downlink manager 815 may receive information from wideband monitor 840 (e.g., via link 876) and from grant processor 835 (e.g., via link 890). Transmission reception manager 845 may receive the data transmission (e.g., from wideband monitor via link 876) in the second bandwidth during a second part of the TTI, and receive the grant (e.g., from grant processor 835 via link 890) in a first part of the TTI before the second part of the TTI. Transmission reception manager 845 may process the grant during the first part of the TTI and prior to receiving the data transmission and receive, based on the grant, a first portion of the data transmission in the first bandwidth during the first part of the TTI prior to switching to monitoring the second bandwidth in the second part of the TTI. In some cases, transmission reception manager 845 may receive an indication of a duration to receive the first portion of the data transmission in one or both of the grant, or a radio resource control message, or a message broadcast to a set of wireless devices (e.g., information received from grant processor 835). In some cases, a time gap is inserted between the control message and the data transmission. In some cases, the data transmission is received in a PDSCH. In some cases, the transmission reception manager 845 may receive the data transmission in the second bandwidth during the TTI, where the grant is received in a previous TTI. In some cases, the TTI is in a first transmit opportunity. In some cases, the previous TTI is in a previous transmit opportunity.

Further, grant processor 835 may send information to CCA component 860 via link 896 and/or DRX component 865 via link 898. CCA component may perform a first CCA during an intermediate TTI based on receiving information from grant processor 835 (e.g., a grant). The intermediate TTI may be after a previous TTI (e.g., associated with a received grant) and before a TTI (e.g., associated with a data transmission). CCA component 860 may determine that the second bandwidth is occupied during the intermediate TTI based on the first CCA or determine that the second bandwidth is clear during the TTI, where determining to monitor the second bandwidth during the TTI is based on determining that the second bandwidth is clear during the TTI. DRX component 865 may determine, during a second TTI, that the wireless device has not received a second grant for resources and enter a DRX mode based on determining that the wireless device has not received the second grant for resources (e.g., DRX component 865 may configure the wireless device to enter a DRX mode based on a lack of information received from grant processor 835).

Figure 9:
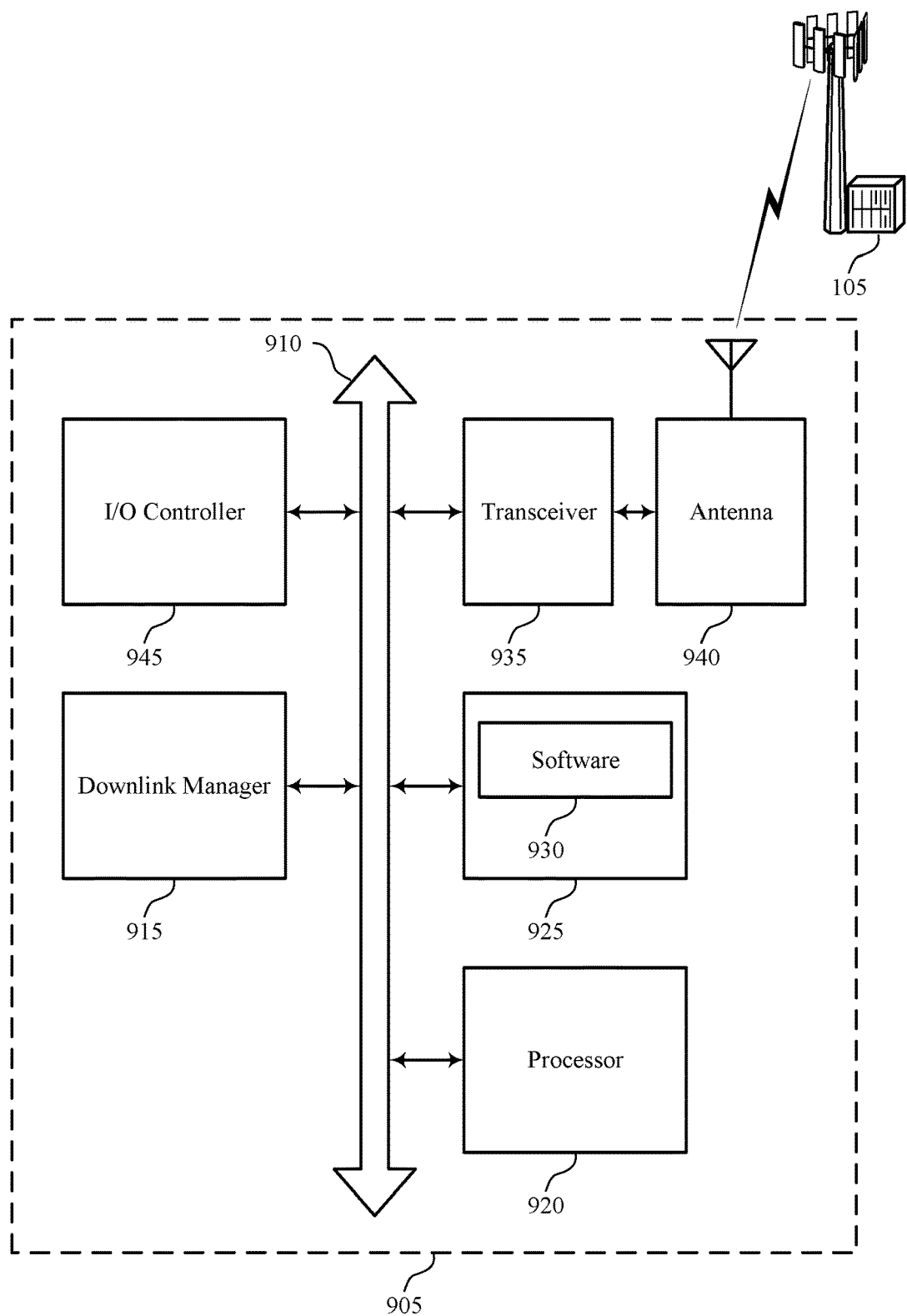
FIG. 9 illustrates a diagram of a system including a user equipment (UE) that supports efficient power utilization for eCCs in accordance with aspects of the present disclosure.

FIG. 9 shows a diagram of a system 900 including a device 905 that supports efficient power utilization for eCCs in accordance with various aspects of the present disclosure. Device 905 may be an example of or include the components of wireless device 605, wireless device 705, or a UE 115 as described above, e.g., with reference to FIGS. 1, 6 and 7. Device 905 may include components for bi-directional voice and data communications including components for transmitting and receiving communications, including downlink manager 915, processor 920, memory 925, software 930, transceiver 935, antenna 940, and I/O controller 945. These components may be in electronic communication via one or more busses (e.g., bus 910). Device 905 may communicate wirelessly with one or more base stations 105.

Processor 920 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting efficient power utilization for eCCs).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a Basic Input-Output system (BIOS) which may control basic hardware and/or software operation such as the interaction with peripheral components or devices.

Software 930 may include code to implement aspects of the present disclosure, including code to support efficient power utilization for eCCs. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system.

Figure 10:
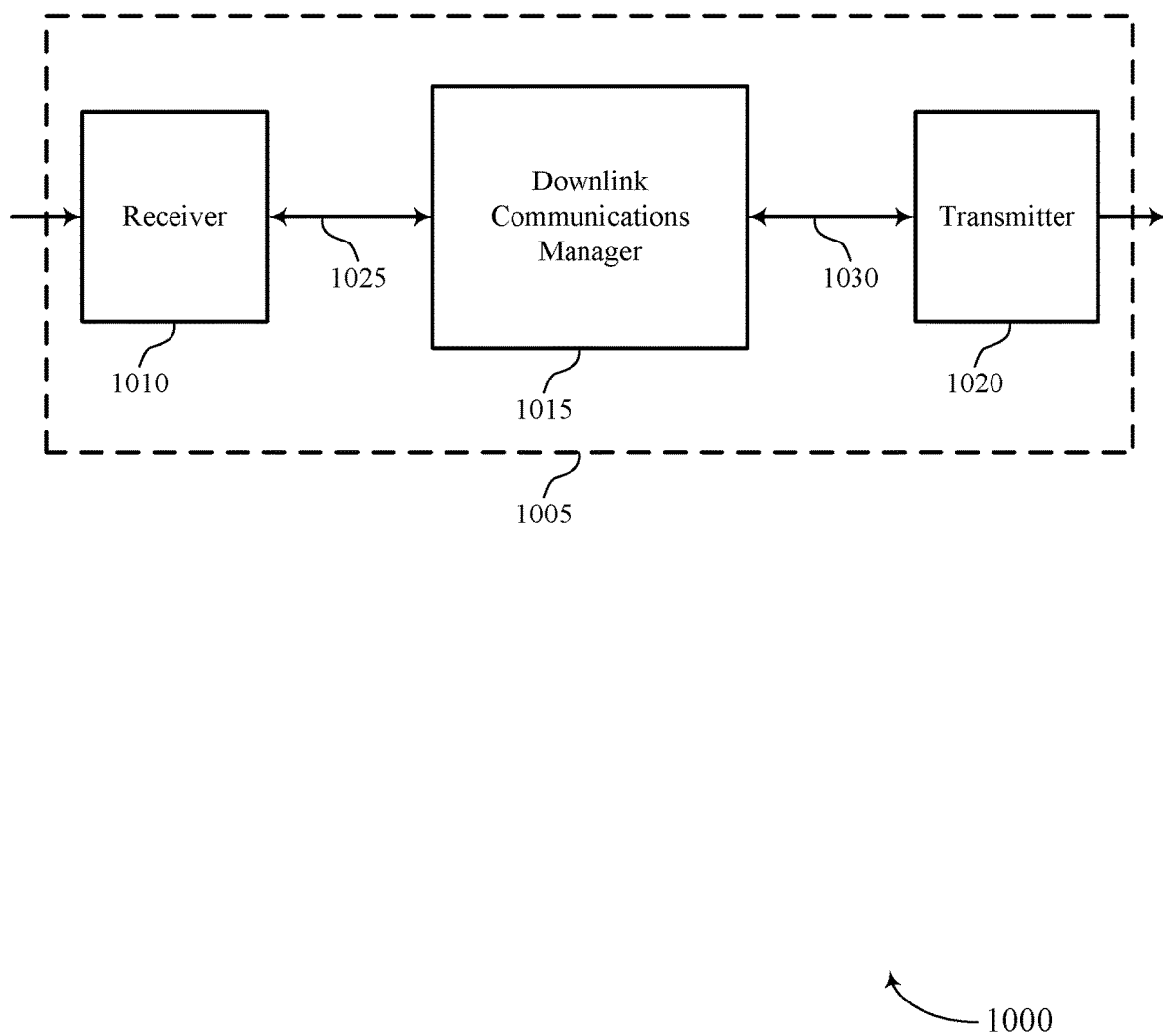
FIGS. 10 through 12 show diagrams of a device that supports efficient power utilization for eCCs in accordance with aspects of the present disclosure.

FIG. 10 shows a block diagram 1000 of a wireless device 1005 that supports efficient power utilization for eCCs in accordance with aspects of the present disclosure. Wireless device 1005 may be an example of aspects of a base station 105 as described herein. Wireless device 1005 may include receiver 1010, downlink communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to Efficient power utilization for eCCs, etc.). Information may be passed on to other components of the device via link 1025. The receiver 1010 may be an example of aspects of the transceiver 1335 described with reference to FIG. 13. The receiver 1010 may utilize a single antenna or a set of antennas.

Downlink communications manager 1015 may be an example of aspects of the downlink communications manager 1315 described with reference to FIG. 13. Downlink communications manager 1015 and/or at least some of its various sub-components may be implemented in hardware, software executed by a processor, firmware, or any combination thereof. If implemented in software executed by a processor, the functions of the downlink communications manager 1015 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The downlink communications manager 1015 and/or at least some of its various sub-components may be physically located at various positions, including being distributed such that portions of functions are implemented at different physical locations by one or more physical devices. In some examples, downlink communications manager 1015 and/or at least some of its various sub-components may be a separate and distinct component in accordance with various aspects of the present disclosure. In other examples, downlink communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Downlink communications manager 1015 may configure control message transmissions that include a grant of downlink data transmission resources for a wireless device. The grant may specify a second bandwidth for a data transmission for the wireless device. Further, downlink communications manager 1015 may schedule a time gap between the control message and the data transmission. Downlink communications manager may obtain information from the receiver 1010 via link 1025, and may pass information (e.g., configured grants, data transmissions, transmission bandwidth information, scheduling information, etc.) to the transmitter 1020 via link 1030.

Transmitter 1020 may transmit signals generated by other components of the device (e.g., transmit based on information received via link 1030). For example, transmitter 1020 may receive information (e.g., relating to a control message that includes a grant of downlink data transmission resources for a wireless device) from the downlink communications manager 1015 via link 1030. In some cases, the information (e.g., the grant) may specify a second bandwidth for a data transmission for the wireless device. The transmitter 1020 may transmit the information in a first bandwidth and transmit, in the second bandwidth, the data transmission during a TTI based on the scheduled time gap. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
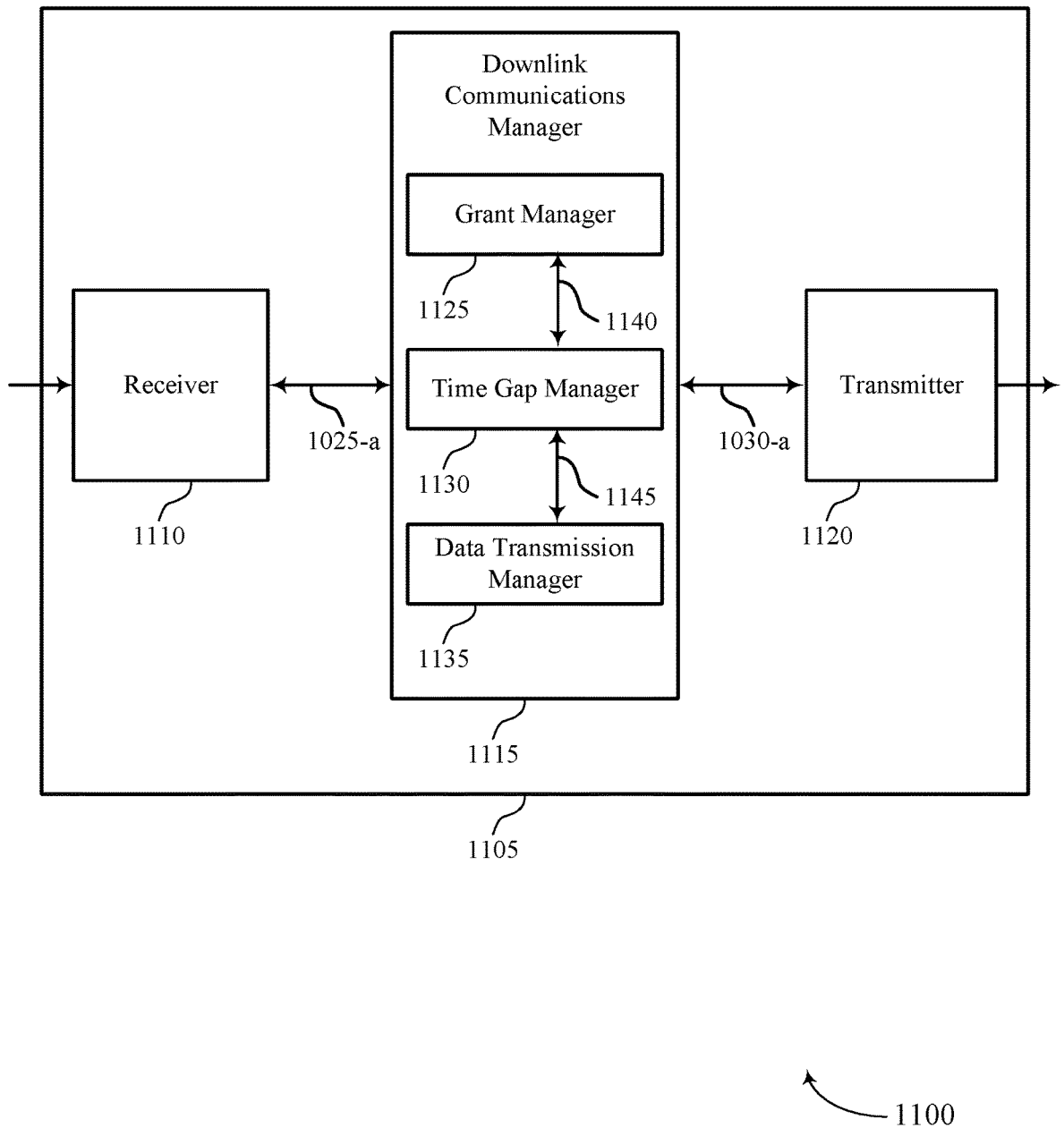

FIG. 11 shows a block diagram 1100 of a wireless device 1105 that supports Efficient power utilization for eCCs in accordance with aspects of the present disclosure. Wireless device 1105 may be an example of aspects of a wireless device 1005 or a base station 105 as described with reference to FIG. 10. Wireless device 1105 may include receiver 1110, downlink communications manager 1115, and transmitter 1120. Wireless device 1105 may also include a processor. Each of these components may be in communication with one another (e.g., via one of links 1025-a, 1030-a, 1140, or 1145).

Receiver 1110 may receive information such as packets, user data, or control information associated with various information channels (e.g., control channels, data channels, and information related to Efficient power utilization for eCCs, etc.). Information may be passed on to other components of the wireless device (e.g., downlink communications manager 1115) via link 1025-a. The receiver 1110 may be an example of aspects of the transceiver 1335 described with reference to FIG. 13. The receiver 1110 may utilize a single antenna or a set of antennas.

Downlink communications manager 1115 may be an example of aspects of the downlink communications manager 1315 described with reference to FIG. 13. Downlink communications manager 1115 may also include grant manager 1125, time gap manager 1130, and data transmission manager 1135.

Grant manager 1125 may configure a control message that includes a grant of downlink data transmission resources for a wireless device. The grant may specify a second bandwidth for a data transmission for the wireless device. In some cases, the second bandwidth includes a wideband. In some cases, the first bandwidth includes a narrowband portion of the wideband. In some cases, the first bandwidth is a portion of the second bandwidth. In some cases, the first bandwidth includes an anchor carrier. In some cases, the second bandwidth includes one or more carriers. In some cases, the one or more carriers include the anchor carrier and one or more other carriers.

Time gap manager 1130 may schedule a time gap between the control message and the data transmission. In some cases, the scheduled time gap allows time for the wireless device to process the grant or prepare receiver circuits to switch from a narrowband receiver to a wideband receiver, or some combination thereof. Time gap manager 1130 and grant manager 1125 may be in communication via link 1140. Data transmission manager 1135 may configure (e.g., for a second bandwidth), a data transmission during a TTI based on, for example, the scheduled time gap (e.g., based on information received from time gap manager 1130 via link 1145).

Transmitter 1120 may transmit signals generated by other components of the device. That is, transmitter 1120 may receive information (e.g., control messages, data transmissions, etc.) for transmission from downlink manager 1115 via link 1030-a. For example, transmitter 1120 may transmit, in a first bandwidth, a control message that includes a grant of downlink data transmission resources for a wireless device, where the grant specifies a second bandwidth for a data transmission for the wireless device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
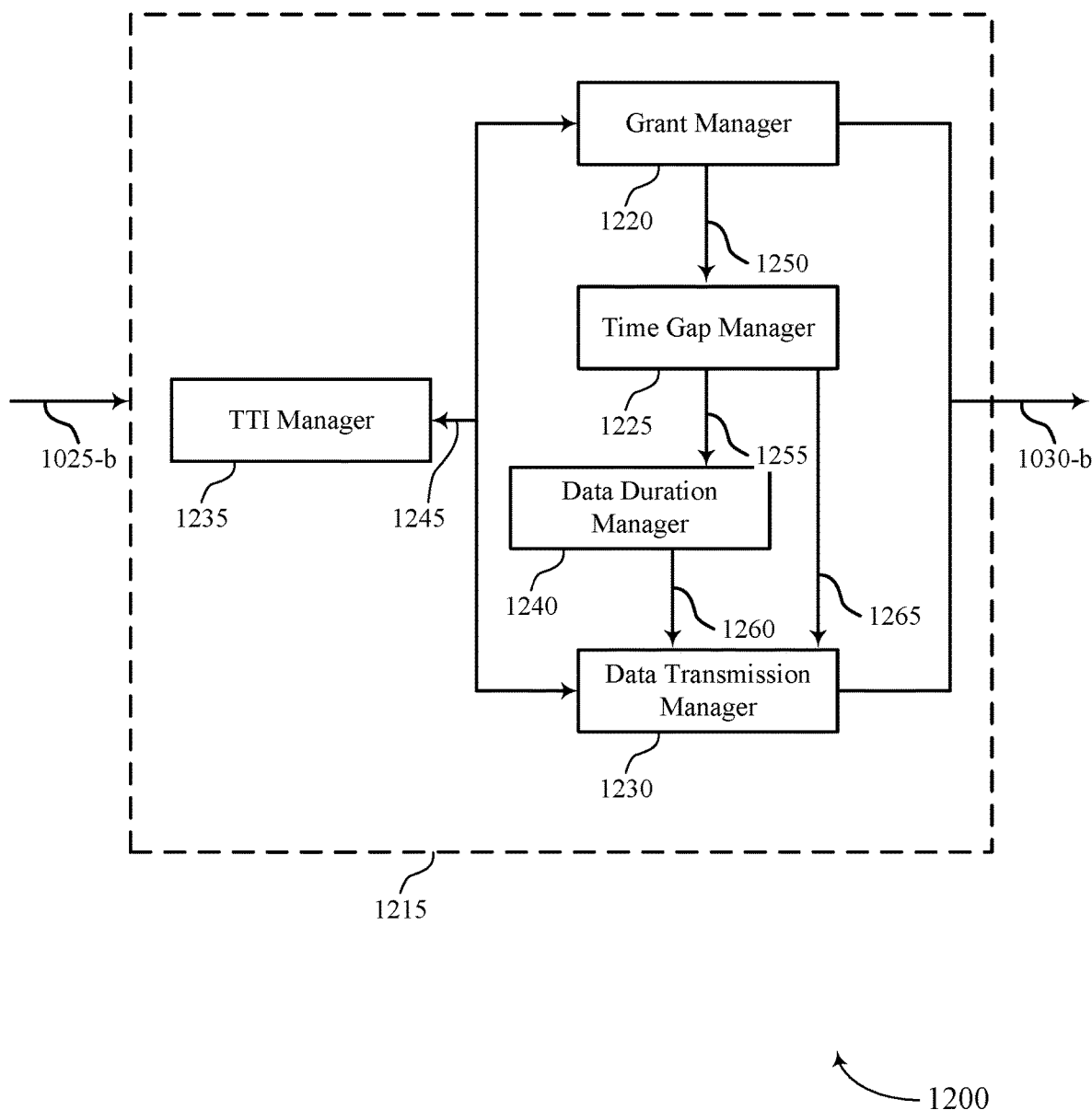

FIG. 12 shows a block diagram 1200 of a downlink communications manager 1215 that supports Efficient power utilization for eCCs in accordance with aspects of the present disclosure. The downlink communications manager 1215 may be an example of aspects of a downlink communications manager 1015, a downlink communications manager 1115, or a downlink communications manager 1315 described with reference to FIGS. 10, 11, and 13. The downlink communications manager 1215 may include grant manager 1220, time gap manager 1225, data transmission manager 1230, TTI manager 1235, and data duration manager 1240. Each of these modules may communicate, directly or indirectly, with one another (e.g., via one or more buses). Downlink communications manager 1215 may receive information from other components of a wireless device (e.g., from a receiver) via link 1025-b, and may pass information to other components of the wireless device (e.g., a transmitter) via link 1030-b.

In some cases, TTI manager 1235 may manage or configure the timing of or TTIs associated with transmissions. For example, TTI manager 1235 may be in communication with grant manager 1220 and data transmission manager 1230 via communication link 1245. The TTI manager may send and receive information, via communication link 1245, to configure transmissions within, for example, one or more TTIs. For example, TTI manager 1235 may exchange information with grant manager 1220, such that a grant may be scheduled or configured in a first part of a TTI before the second part of the TTI, in addition to exchanging information with data transmission manager 1230, such that a data transmission in a second bandwidth (e.g., a wideband) may be scheduled or configured during the second part of the TTI. The grant manager 1220 and data transmission manager 1230 may pass information to other components of the wireless device (e.g., a transmitter) via link 1030-b. In other cases, TTI manager 1235 may exchange information with grant manager 1220, such that a grant may be scheduled or configured in a first TTI, and exchange information with data transmission manager 1230, such that a data transmission in a second bandwidth (e.g., a wideband) may be scheduled or configured during a second TTI.

Grant manager 1220 may configure a transmission (e.g., a control message in a first bandwidth) that includes a grant of downlink data transmission resources for a wireless device. The grant may specify a second bandwidth for a data transmission for the wireless device. In some cases, the second bandwidth includes a wideband. In some cases, the first bandwidth includes a narrowband portion of the wideband. In some cases, the first bandwidth is a portion of the second bandwidth. In some cases, the first bandwidth includes an anchor carrier. In some cases, the second bandwidth includes one or more carriers. In some cases, the one or more carriers include the anchor carrier and one or more other carriers. Grant manager 1220 may pass information (e.g., including scheduling/configuration information received from TTI manager 1235) to other components of the wireless device via link 1030-b. For example, a transmitter may obtain such information (e.g., grant information such as downlink resources, location of a grant within a TTI, etc.) and transmit a grant accordingly (e.g., over a narrowband, in the first part of a TTI, etc.).

Time gap manager 1225 may schedule a time gap between the control message and the data transmission. In some cases, the scheduled time gap allows time for the wireless device to process the grant or prepare receiver circuits to switch from a narrowband receiver to a wideband receiver, or some combination thereof. In some cases, the time gap may be scheduled based on information received from grant manager 1220. For example, grant manager 1220 may indicate (e.g., via link 1250) a start time and or location within a TTI during which a grant is configured. Time gap manager 1225 may use such information to configure a time gap. Additionally or alternatively, time gap manager may receive information from other components of the wireless device (e.g., via link 1025-b) such as a warmup time for an intended recipient to power additional receiver circuitry to receive a data transmission. The time gap scheduled by time gap manager 1225 may take some or all of such information into account, and pass information relating to the scheduled time gap to data duration manager 1240 via link 1255, or pass the information directly to data transmission manager 1230 via link 1265. Data duration manager 1240 may determine a duration associated with a data transmission based on, for example, information received from time gap manager 1225 via link 1255. Data duration manager 1240 may determine a duration associated with a data transmission and may pass on such information to data transmission manager 1230 via link 1260. In some cases, data duration manager 1240 may divide or break a data transmission into two portions.

Data transmission manager 1230 may receive information from components of downlink communications manager 1215 to configure data transmissions. For example, data transmission manager 1230 may configure a data transmission (e.g., over the second bandwidth) during all or a portion of a TTI (e.g., based on information received from TTI manager 1235 via link 1245) based on a scheduled time gap (e.g., based on information received from time gap manager 1225 via link 1265) according to some duration (e.g., based on information received from data duration manager 1240 via link 1260). Data transmission manager 1230 may pass information (e.g., including scheduling/configuration information received from TTI manager 1235, time gap information from time gap manager 1225, data transmission duration information from data duration manager 1240, etc.) to other components of the wireless device via link 1030-*b*. For example, a transmitter may obtain such information (e.g., data transmission information such as transmission duration, location of a data within a TTI, etc.) and transmit the data transmission accordingly (e.g., over a narrowband in the second part of a first TTI, over a wideband in a second TTI, etc.).

As an example, a transmitter may receive such information discussed above (e.g., via link 1030-*b*) and transmit, as a grant, a radio resource control message, or a message broadcast to a set of wireless devices, an indication of a duration of a first portion of the data transmission (e.g., based on information received from data transmission manager 1230 and/or data duration manager 1240). The transmitter may then transmit, based on the grant (e.g., information received from grant manager 1220), a first portion of the data transmission in the first bandwidth during the first part of the TTI prior to transmitting a second portion of the data transmission in the second bandwidth in the second part of the TTI (e.g., based on information received from TTI manager 1235). The transmitter may then transmit the data transmission in the second bandwidth during the TTI, where the grant is transmitted in a previous TTI. In some cases, the TTI is in a first transmit opportunity. In some cases, the previous TTI is in a previous transmit opportunity.

Figure 13:
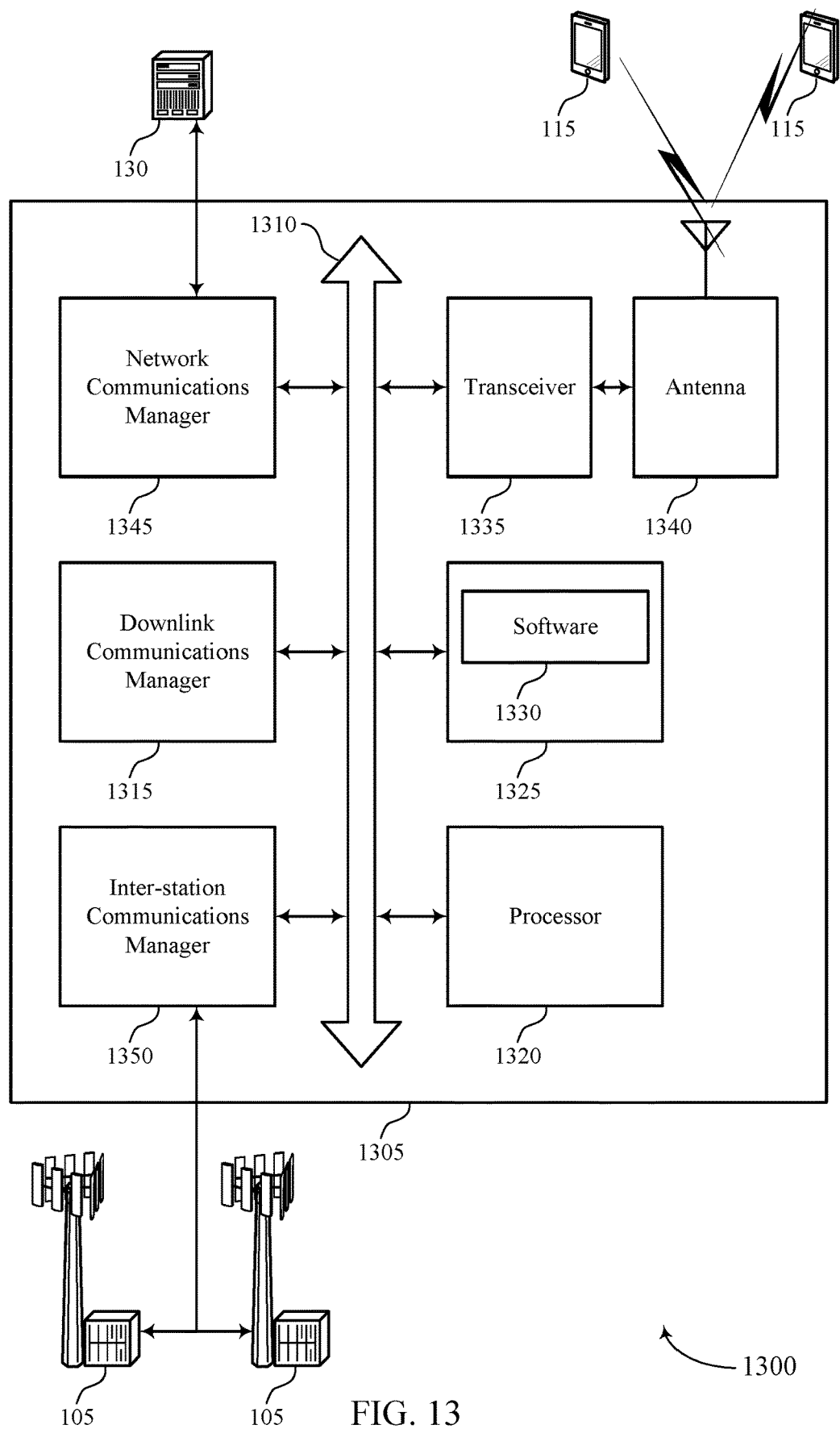
FIG. 13 illustrates a diagram of a system including a base station that supports efficient power utilization for eCCs in accordance with aspects of the present disclosure.

FIG. 13 shows a diagram of a system 1300 including a device 1305 that supports Efficient power utilization for eCCs in accordance with aspects of the present disclosure. Device 1305 may be an example of or include the components of wireless device 1005, wireless device 1105, or a base station 105 as described above, e.g., with reference to FIGS. 10 and 11. Device 1305 may include components for bi-directional voice and data communications including components for transmitting and receiving communications, including downlink communications manager 1315, processor 1320, memory 1325, software 1330, transceiver 1335, antenna 1340, network communications manager 1345, and interstation communications manager 1350. These components may be in electronic communication via one or more buses (e.g., bus 1310). Device 1305 may communicate wirelessly with one or more user equipment (UE)s 115.

Processor 1320 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting Efficient power utilization for eCCs).

Memory 1325 may include random access memory (RAM) and read only memory (ROM). The memory 1325 may store computer-readable, computer-executable software 1330 including instructions that, when executed, cause the processor to perform various functions described herein. In some cases, the memory 1325 may contain, among other things, a basic input/output system (BIOS) which may control basic hardware and/or software operation such as the interaction with peripheral components or devices.

Software 1330 may include code to implement aspects of the present disclosure, including code to support Efficient power utilization for eCCs. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an Long Term Evolution (LTE)/LTE-A wireless communication network technology to provide communication between base stations 105.

Figure 14:
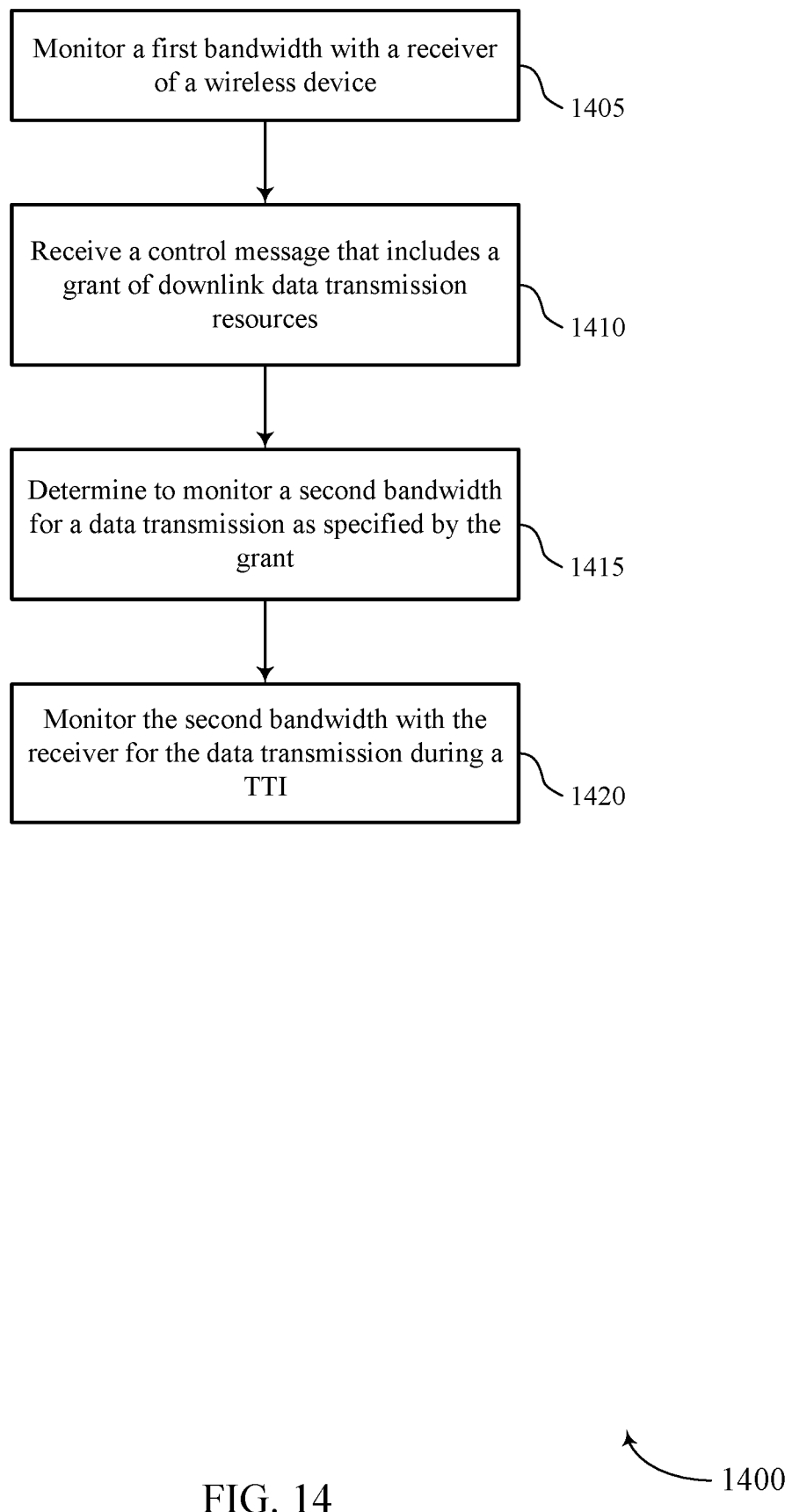
FIGS. 14 through 17 illustrate methods for efficient power utilization for eCCs in accordance with aspects of the present disclosure.

FIG. 14 shows a flowchart illustrating a method 1400 for efficient power utilization for eCCs in accordance with various aspects of the present disclosure. The operations of method 1400 may be implemented by a UE 115 or its components as described herein. For example, the operations of method 1400 may be performed by a downlink manager as described with reference to FIGS. 6 through 9. In some examples, a UE 115 may execute a set of codes to control the functional elements of the device to perform the functions described below. Additionally or alternatively, the UE 115 may perform aspects the functions described below using special-purpose hardware.

At block 1405 the UE 115 may monitor a first bandwidth with a receiver of a wireless device. For example, the UE 115 may configure a receiver or circuitry of a receiver to monitor for transmissions over a limited bandwidth (e.g., a narrowband). That is, the UE 115 may power a separate receiver associated with less capabilities than a main receiver, or may power a portion of circuitry associated with a main receiver, such that a bandwidth is monitored while consuming a reduced amount of power. The operations of block 1405 may be performed according to the methods described with reference to FIGS. 1 through 5. In certain examples, aspects of the operations of block 1405 may be performed by a narrowband monitor as described with reference to FIGS. 6 through 9.

At block 1410 the UE 115 may receive, in the first bandwidth, a control message that includes a grant of downlink data transmission resources for the wireless device. For example, the UE 115 may receive the control message using receiver as described above. The control message may refer to a grant that includes bits indicating time-frequency resources for subsequent downlink transmissions. The operations of block 1410 may be performed according to the methods described with reference to FIGS. 1 through 5. In certain examples, aspects of the operations of block 1410 may be performed by a control message manager as described with reference to FIGS. 6 through 9.

At block 1415 the UE 115 may determine to monitor a second bandwidth for a data transmission for the wireless device as specified by the grant. For example, the control message may indicate an additional bandwidth range associated with a subsequent data transmission. The UE 115 may determine to monitor the second bandwidth based on the indication information will be transmitted over different (e.g., additional or alternate) frequency ranges than are currently being monitored. In some cases, the first bandwidth may be a portion of the second bandwidth. The operations of block 1415 may be performed according to the methods described with reference to FIGS. 1 through 5. In certain examples, aspects of the operations of block 1415 may be performed by a grant processor as described with reference to FIGS. 6 through 9.

At block 1420 the UE 115 may monitor the second bandwidth with the receiver for the data transmission during a TTI. For example, the UE 115 may receive information included in the grant, and switch receivers (e.g., to a main receiver) or power additional circuitry of a receiver to monitor additional or alternate bandwidth (e.g., frequency ranges). The second bandwidth (e.g., indicated by the grant) may be monitored for a duration of a TTI. The operations of block 1420 may be performed according to the methods described with reference to FIGS. 1 through 5. In certain examples, aspects of the operations of block 1420 may be performed by a wideband monitor as described with reference to FIGS. 6 through 9.

Figure 15:
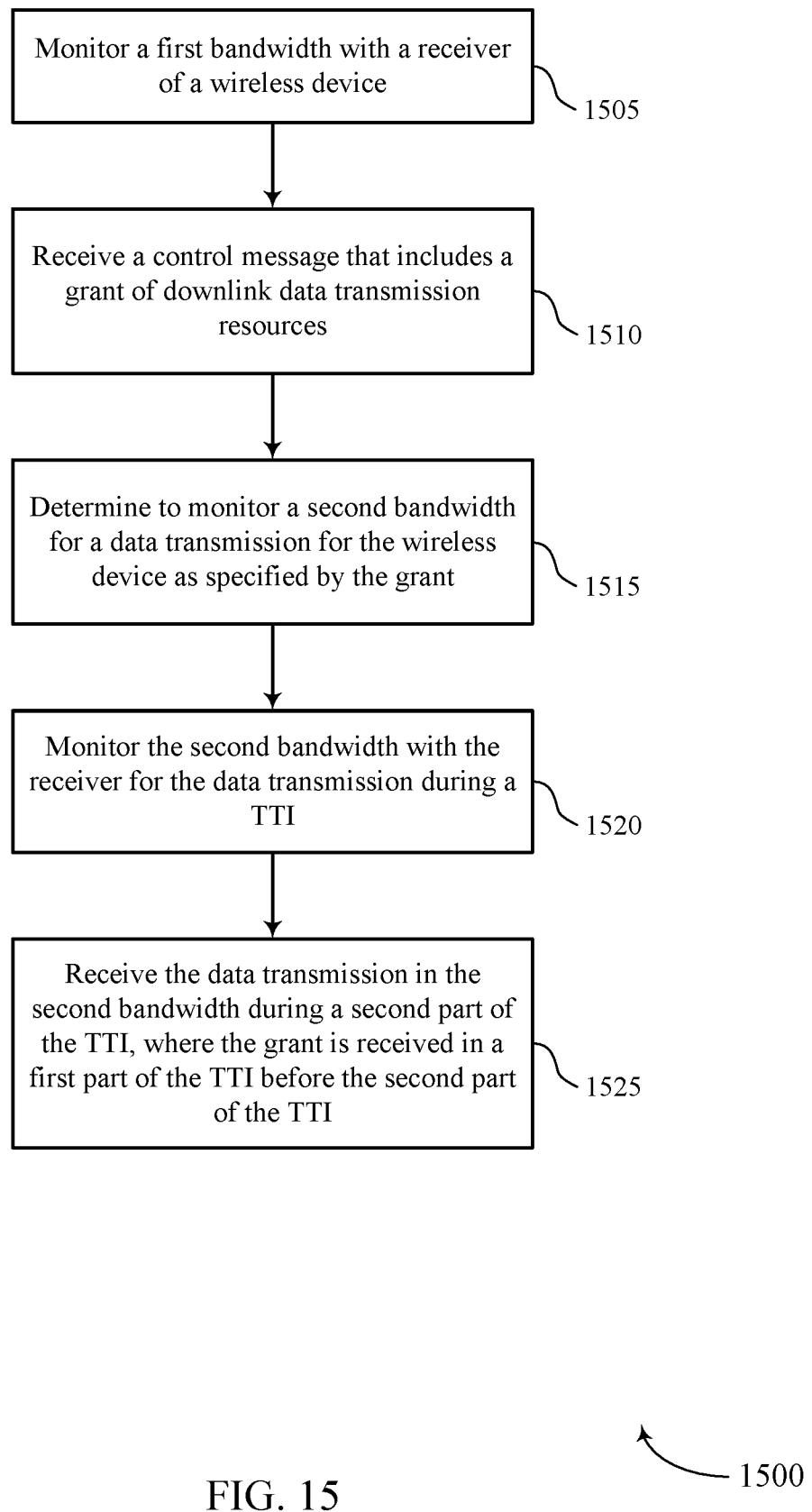

FIG. 15 shows a flowchart illustrating a method 1500 for efficient power utilization for eCCs in accordance with various aspects of the present disclosure. The operations of method 1500 may be implemented by a UE 115 or its components as described herein. For example, the operations of method 1500 may be performed by a downlink manager as described with reference to FIGS. 6 through 9. In some examples, a UE 115 may execute a set of codes to control the functional elements of the device to perform the functions described below. Additionally or alternatively, the UE 115 may perform aspects the functions described below using special-purpose hardware.

At block 1505 the UE 115 may monitor a first bandwidth with a receiver of a wireless device. The operations of block 1505 may be performed according to the methods described with reference to FIGS. 1 through 5. In certain examples, aspects of the operations of block 1505 may be performed by a narrowband monitor as described with reference to FIGS. 6 through 9.

At block 1510 the UE 115 may receive, in the first bandwidth, a control message that includes a grant of downlink data transmission resources for the wireless device. The operations of block 1510 may be performed according to the methods described with reference to FIGS. 1 through 5. In certain examples, aspects of the operations of block 1510 may be performed by a control message manager as described with reference to FIGS. 6 through 9.

At block 1515 the UE 115 may determine to monitor a second bandwidth for a data transmission for the wireless device as specified by the grant, wherein the first bandwidth is a portion of the second bandwidth. The operations of block 1515 may be performed according to the methods described with reference to FIGS. 1 through 5. In certain examples, aspects of the operations of block 1515 may be performed by a grant processor as described with reference to FIGS. 6 through 9.

At block 1520 the UE 115 may monitor the second bandwidth with the receiver for the data transmission during a TTI. The operations of block 1520 may be performed according to the methods described with reference to FIGS. 1 through 5. In certain examples, aspects of the operations of block 1520 may be performed by a wideband monitor as described with reference to FIGS. 6 through 9.

At block 1525 the UE 115 may receive the data transmission in the second bandwidth during a second part of the TTI, wherein the grant is received in a first part of the TTI before the second part of the TTI. The operations of block 1525 may be performed according to the methods described with reference to FIGS. 1 through 5. In certain examples, aspects of the operations of block 1525 may be performed by a transmission reception manager as described with reference to FIGS. 6 through 9.

Figure 16:
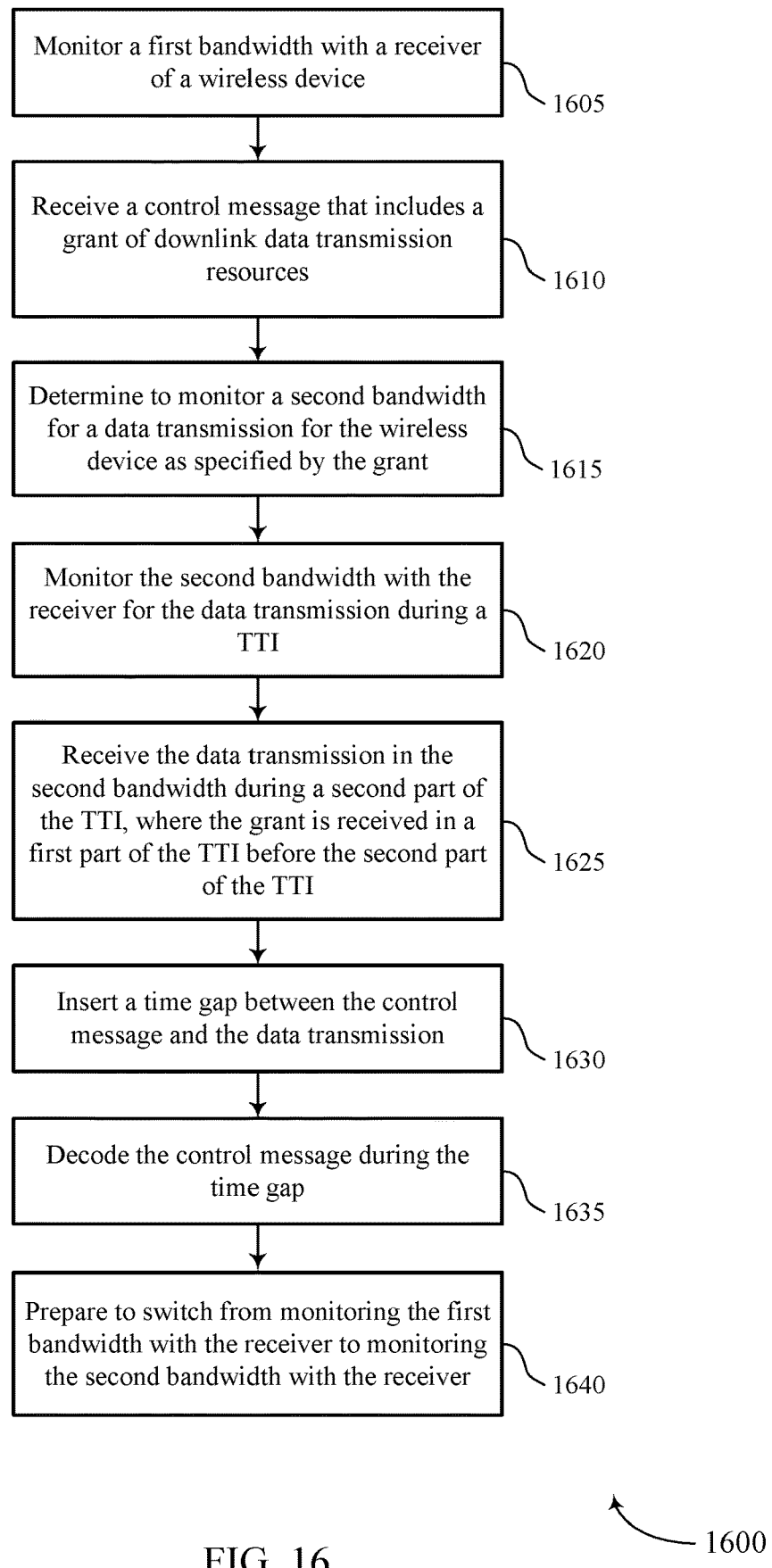

FIG. 16 shows a flowchart illustrating a method 1600 for efficient power utilization for eCCs in accordance with various aspects of the present disclosure. The operations of method 1600 may be implemented by a UE 115 or its components as described herein. For example, the operations of method 1600 may be performed by a downlink manager as described with reference to FIGS. 6 through 9. In some examples, a UE 115 may execute a set of codes to control the functional elements of the device to perform the functions described below. Additionally or alternatively, the UE 115 may perform aspects the functions described below using special-purpose hardware.

At block 1605 the UE 115 may monitor a first bandwidth with a receiver of a wireless device. The operations of block 1605 may be performed according to the methods described with reference to FIGS. 1 through 5. In certain examples, aspects of the operations of block 1605 may be performed by a narrowband monitor as described with reference to FIGS. 6 through 9.

At block 1610 the UE 115 may receive, in the first bandwidth, a control message that includes a grant of downlink data transmission resources for the wireless device. The operations of block 1610 may be performed according to the methods described with reference to FIGS. 1 through 5. In certain examples, aspects of the operations of block 1610 may be performed by a control message manager as described with reference to FIGS. 6 through 9.

At block 1615 the UE 115 may determine to monitor a second bandwidth for a data transmission for the wireless device as specified by the grant, wherein the first bandwidth is a portion of the second bandwidth. The operations of block 1615 may be performed according to the methods described with reference to FIGS. 1 through 5. In certain examples, aspects of the operations of block 1615 may be performed by a grant processor as described with reference to FIGS. 6 through 9.

At block 1620 the UE 115 may monitor the second bandwidth with the receiver for the data transmission during a TTI. The operations of block 1620 may be performed according to the methods described with reference to FIGS. 1 through 5. In certain examples, aspects of the operations of block 1620 may be performed by a wideband monitor as described with reference to FIGS. 6 through 9.

At block 1625 the UE 115 may receive the data transmission in the second bandwidth during a second part of the TTI, wherein the grant is received in a first part of the TTI before the second part of the TTI. The operations of block 1625 may be performed according to the methods described with reference to FIGS. 1 through 5. In certain examples, aspects of the operations of block 1625 may be performed by a transmission reception manager as described with reference to FIGS. 6 through 9.

At block 1630 the UE 115 may a time gap is inserted between the control message and the data transmission. The operations of block 1630 may be performed according to the methods described with reference to FIGS. 1 through 5. In certain examples, aspects of the operations of block 1630 may be performed by a transmission reception manager as described with reference to FIGS. 6 through 9.

At block 1635 the UE 115 may decode the control message during the time gap. The operations of block 1635 may be performed according to the methods described with reference to FIGS. 1 through 5. In certain examples, aspects of the operations of block 1635 may be performed by a message decoder as described with reference to FIGS. 6 through 9.

At block 1640 the UE 115 may prepare to switch from monitoring the first bandwidth with the receiver to monitoring the second bandwidth with the receiver. The operations of block 1640 may be performed according to the methods described with reference to FIGS. 1 through 5. In certain examples, aspects of the operations of block 1640 may be performed by a circuitry switcher as described with reference to FIGS. 6 through 9.

Figure 17:
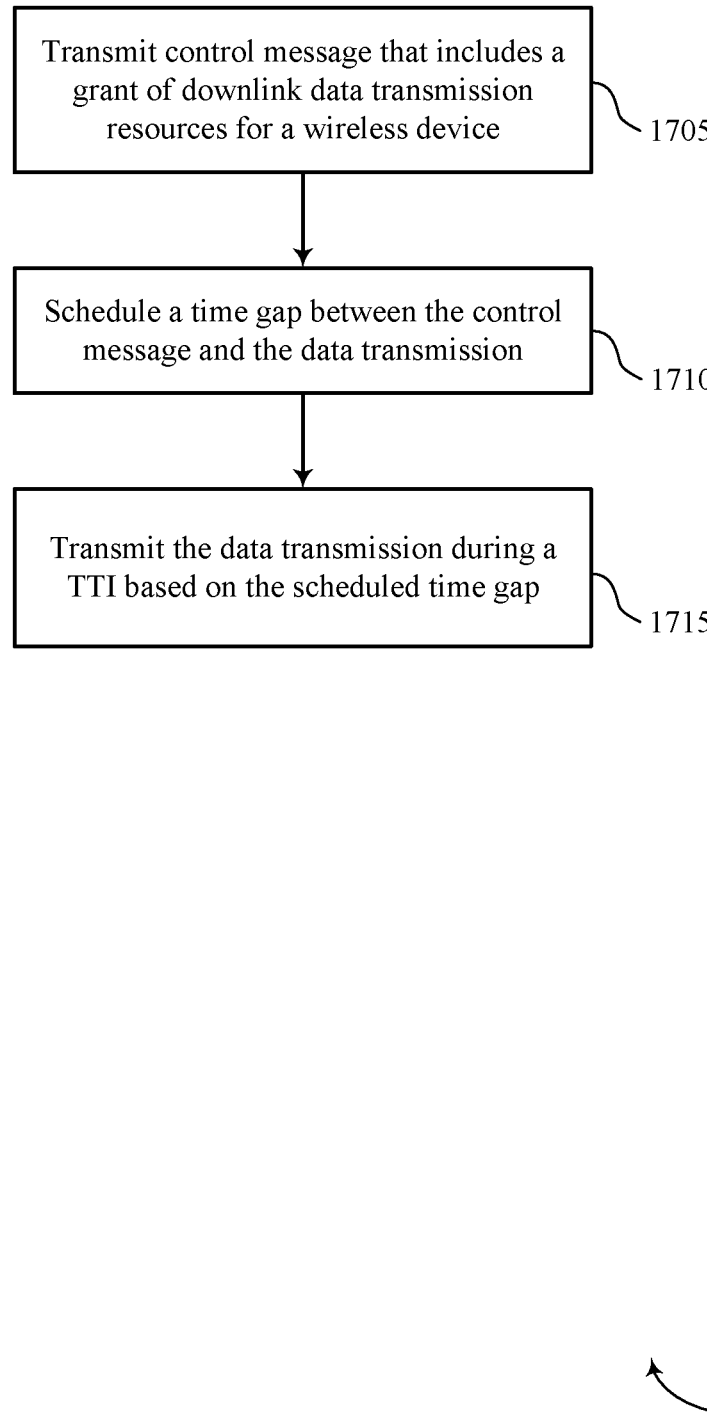

FIG. 17 shows a flowchart illustrating a method 1700 for Efficient power utilization for eCCs in accordance with aspects of the present disclosure. The operations of method 1700 may be implemented by a base station 105 or its components as described herein. For example, the operations of method 1700 may be performed by a downlink communications manager as described with reference to FIGS. 14 through 13. In some examples, a base station 105 may execute a set of codes to control the functional elements of the device to perform the functions described below.

Additionally or alternatively, the base station 105 may perform aspects of the functions described below using special-purpose hardware.

At block 1705 the base station 105 may transmit, in a first bandwidth, a control message that includes a grant of downlink data transmission resources for a wireless device, wherein the grant specifies a second bandwidth for a data transmission for the wireless device. The operations of block 1705 may be performed according to the methods described herein. In certain examples, aspects of the operations of block 1705 may be performed by a grant manager as described with reference to FIGS. 14 through 13.

At block 1710 the base station 105 may schedule a time gap between the control message and the data transmission. The operations of block 1710 may be performed according to the methods described herein. In certain examples, aspects of the operations of block 1710 may be performed by a time gap manager as described with reference to FIGS. 14 through 13.

At block 1715 the base station 105 may transmit, in the second bandwidth, the data transmission during a TTI based at least in part on the scheduled time gap. The operations of block 1715 may be performed according to the methods described herein. In certain examples, aspects of the operations of block 1715 may be performed by a data transmission manager as described with reference to FIGS. 14 through 13.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   monitoring a first bandwidth of downlink resources at a wireless device, the first bandwidth associated with a first subcarrier spacing;
   receiving a control message that includes a grant indicating a second bandwidth of downlink resources associated with a data transmission, the second bandwidth associated with a second subcarrier spacing different than the first subcarrier spacing;
   determining to monitor the second bandwidth based at least in part on receiving the grant that indicates the second bandwidth; and
   monitoring the second bandwidth for the data transmission during a transmission time interval (TTI) based at least in part on determining to monitor the second bandwidth, wherein a time gap exists between the control message and the data transmission.

2. The method of claim 1, wherein the time gap allows the wireless device to switch from monitoring the first bandwidth to monitoring the second bandwidth, and wherein the time gap does not include any transmissions to the wireless device.

3. The method of claim 1, wherein the time gap allows the wireless device to prepare receiver circuitry to switch from receiving in the first bandwidth to receiving in the second bandwidth.

4. The method of claim 1, wherein the second bandwidth comprises a subset of frequencies on a same cell as the first bandwidth.

5. The method of claim 1, wherein the first bandwidth and the second bandwidth at least partially overlap.

6. The method of claim 5, wherein:
   the second bandwidth comprises a wideband;
   the first bandwidth comprises a narrowband portion of the wideband; and
   the first bandwidth is a portion of the second bandwidth.

7. The method of claim 1, wherein:
   the second bandwidth comprises a first wideband;
   the first bandwidth comprises a narrowband portion of a second wideband; and
   the first bandwidth is not overlapping with the second bandwidth.

8. The method of claim 1, further comprising:
   decoding the control message during the time gap; and
   preparing to switch from monitoring the first bandwidth with a receiver of the wireless device to monitoring the second bandwidth with the receiver.

9. The method of claim 1, wherein:
   monitoring the first bandwidth comprises monitoring the first bandwidth with a narrowband receiver circuit of a receiver of the wireless device; and
   monitoring the second bandwidth comprises monitoring the second bandwidth with a wideband receiver circuit of the receiver.

10. The method of claim 1, wherein:
    the first bandwidth comprises an anchor carrier; and
    the second bandwidth comprises one or more carriers.

11. The method of claim 1, further comprising:
    receiving the data transmission in the second bandwidth during a second part of the TTI, wherein the grant is received in a first part of the TTI before the second part of the TTI.

12. The method of claim 11, further comprising:
    processing the grant during the first part of the TTI and prior to receiving the data transmission.

13. The method of claim 11, further comprising:
    receiving, based at least in part on the grant, a first portion of the data transmission in the first bandwidth during the first part of the TTI prior to switching to monitoring the second bandwidth in the second part of the TTI.

14. The method of claim 13, further comprising:
    receiving an indication of a duration to receive the first portion of the data transmission in one or both of the grant, or a radio resource control message, or a message broadcast to a plurality of wireless devices.

15. The method of claim 1, further comprising:
    receiving the data transmission in the second bandwidth during the TTI, wherein the grant is received in a previous TTI.

16. The method of claim 15, further comprising:
    receiving, in the first bandwidth during the TTI, the control message that includes the grant of downlink data transmission resources of a second TTI, wherein the second TTI follows the TTI.

17. The method of claim 1, further comprising:
receiving a radio resource control (RRC) message comprising an indication of the time gap, wherein monitoring the second bandwidth for the data transmission is based at least in part on receiving the RRC message comprising the indication of the time gap.

18. A method for wireless communication, comprising:
determining to transmit a data transmission via a second bandwidth of downlink resources that is associated with a second subcarrier spacing different than the first subcarrier spacing;
transmitting, in a first bandwidth of downlink resources that is associated with a first subcarrier spacing, a control message that includes a grant for a wireless device indicating the second bandwidth of downlink resources based at least in part on determining to transmit the data transmission via the second bandwidth of downlink resources;
scheduling a time gap between the control message and the data transmission based at least in part on the control message; and
transmitting, in the second bandwidth, the data transmission during a transmission time interval (TTI) based at least in part on the time gap.

19. The method of claim 18, wherein the time gap allows time for the wireless device to switch from monitoring the first bandwidth to monitoring the second bandwidth, and wherein the time gap does not include any transmissions to the wireless device.

20. The method of claim 18, wherein the time gap allows time for the wireless device to prepare receiver circuitry to switch from receiving in the first bandwidth to receiving in the second bandwidth.

21. The method of claim 18, wherein the first bandwidth and the second bandwidth at least partially overlap.

22. The method of claim 21, wherein:
the second bandwidth comprises a wideband;
the first bandwidth comprises a narrowband portion of the wideband; and
the first bandwidth is a portion of the second bandwidth.

23. The method of claim 18, wherein:
the first bandwidth comprises an anchor carrier; and
the second bandwidth comprises one or more carriers.

24. The method of claim 18, further comprising:
transmitting the data transmission in the second bandwidth during a second part of the TTI, wherein the grant is transmitted in a first part of the TTI before the second part of the TTI.

25. The method of claim 24, further comprising:
transmitting, based at least in part on the grant, a first portion of the data transmission in the first bandwidth during the first part of the TTI prior to transmitting a second portion of the data transmission in the second bandwidth in the second part of the TTI.

26. The method of claim 18, further comprising:
transmitting the data transmission in the second bandwidth during the TTI, wherein the grant is transmitted in a previous TTI.

27. The method of claim 18, further comprising:
transmitting a radio resource control (RRC) message comprising an indication of the time gap, wherein transmitting the data transmission is based at least in part on transmitting the RRC message comprising the indication of the time gap.

28. An apparatus for wireless communication, in a system comprising:
a processor;
memory coupled with the processor; and
instructions stored in the memory, the instructions being executable by the processor to:
monitor a first bandwidth of downlink resources at a wireless device, the first bandwidth associated with a first subcarrier spacing;
receive a control message that includes a grant indicating a second bandwidth of downlink resources associated with a data transmission, the second bandwidth associated with a second subcarrier spacing different than the first subcarrier spacing;
determine to monitor the second bandwidth based at least in part on receiving the grant that indicates the second bandwidth; and
monitor the second bandwidth for the data transmission during a transmission time interval (TTI) based at least in part on determining to monitor second bandwidth, wherein a time gap exists between the control message and the data transmission.

29. An apparatus for wireless communication, in a system comprising:
a processor;
memory coupled with the processor; and
instructions stored in the memory, the instructions being executable by the processor to:
determine to transmit a data transmission via a second bandwidth of downlink resources that is associated with a second subcarrier spacing different than the first subcarrier spacing;
transmit, in a first bandwidth of downlink resources that is associated with a first subcarrier spacing, a control message that includes a grant for a wireless device indicating the second bandwidth of downlink resources based at least in part on determining to transmit the data transmission via the second bandwidth of downlink resources;
schedule a time gap between the control message and the data transmission based at least in part on the control message; and
transmit, in the second bandwidth, the data transmission during a transmission time interval (TTI) based at least in part on the time gap.

* * * * *